US010106323B2

(12) United States Patent
Terrill et al.

(10) Patent No.: US 10,106,323 B2
(45) Date of Patent: Oct. 23, 2018

(54) APPARATUS FOR POSITIONING AN AUTOMATED LIFTING STORAGE CART AND RELATED METHODS

(71) Applicant: Swisslog Logistics, Inc., Newport News, VA (US)

(72) Inventors: Mike Terrill, Lathrop, CA (US); Mohan Ramankutty, Mountain House, CA (US); Christopher Brumm, Ripon, CA (US); Pat Mitchell, Lathrop, CA (US); Rodney Tipton, Lathrop, CA (US)

(73) Assignee: Swisslog Logistics, Inc., Newport News, VA (US)

( * ) Notice: Subject to any disclaimer, the term of this patent is extended or adjusted under 35 U.S.C. 154(b) by 0 days.

(21) Appl. No.: 15/115,067

(22) PCT Filed: Jan. 22, 2015

(86) PCT No.: PCT/US2015/012366
§ 371 (c)(1),
(2) Date: Jul. 28, 2016

(87) PCT Pub. No.: WO2015/112665
PCT Pub. Date: Jul. 30, 2015

(65) Prior Publication Data
US 2017/0008701 A1 Jan. 12, 2017

Related U.S. Application Data

(60) Provisional application No. 61/931,416, filed on Jan. 24, 2014.

(51) Int. Cl.
B65G 1/137 (2006.01)
B65G 1/04 (2006.01)
B62B 3/06 (2006.01)

(52) U.S. Cl.
CPC ............ B65G 1/137 (2013.01); B62B 3/06 (2013.01); B65G 1/0492 (2013.01); B65G 2209/06 (2013.01)

(58) Field of Classification Search
CPC .. B65G 1/137; B65G 1/0492; B65G 2209/06; B62B 3/06
See application file for complete search history.

(56) References Cited

U.S. PATENT DOCUMENTS 1,664,499 A 4/1928 Baker
2,808,996 A 10/1957 Delfox
(Continued)

FOREIGN PATENT DOCUMENTS

WO 2015/058192 A1 4/2015
WO 2015/134529 A1 9/2015

OTHER PUBLICATIONS

International Search Report and Written Opinion for PCT/US2015/12366, dated Apr. 14, 2015.
(Continued)

Primary Examiner — Mussa A Shaawat
Assistant Examiner — Michael V Kerrigan
(74) Attorney, Agent, or Firm — Bachman & LaPointe, P.C.

(57) ABSTRACT

A system for positioning a lifting cart in an automated storage facility is described. In one example, the system includes a motorized lifting cart configured to move about a railway of a storage area. An encoder on the cart reads a property of rotation of a rotating element on the cart, and a controller may receive the property of rotation from the encoder and convert it to a rotation count of the rotating element. The rotating element may be an encoder shaft, drive shaft, and like elements. Some systems include a
(Continued)

signal emitter or photo sensor to position the lifting cart and to facilitate providing instructions to the cart.

34 Claims, 25 Drawing Sheets

(56) References Cited

U.S. PATENT DOCUMENTS

| | | | | |
|---|---|---|---|---|
| 5,970,438 A | * | 10/1999 | Clark | B61K 9/08 |
| | | | | 702/184 |
| 6,280,135 B1 | | 8/2001 | Cunningham | |
| 6,400,452 B1 | * | 6/2002 | Maynard | G01S 7/003 |
| | | | | 342/457 |
| 6,493,614 B1 | * | 12/2002 | Jung | G05D 1/0246 |
| | | | | 180/168 |
| 6,550,523 B1 | | 4/2003 | Chen | |
| 6,652,213 B1 | | 11/2003 | Mitchell et al. | |
| 2004/0193339 A1 | * | 9/2004 | Hulden | G05D 1/0272 |
| | | | | 701/23 |
| 2004/0210343 A1 | * | 10/2004 | Kim | G05D 1/0253 |
| | | | | 700/245 |
| 2005/0118003 A1 | | 6/2005 | Mitchell et al. | |
| 2010/0316469 A1 | * | 12/2010 | Lert | B65G 1/045 |
| | | | | 414/273 |
| 2012/0297559 A1 | | 11/2012 | Lee et al. | |
| 2013/0129456 A1 | | 5/2013 | Salichs et al. | |

OTHER PUBLICATIONS

International Search Report and Written Opinion for PCT/2015/018530, dated Jul. 2, 2015.
International Search Report and Written Opinion for PCT/2014/061372, dated Feb. 4, 2015.

\* cited by examiner

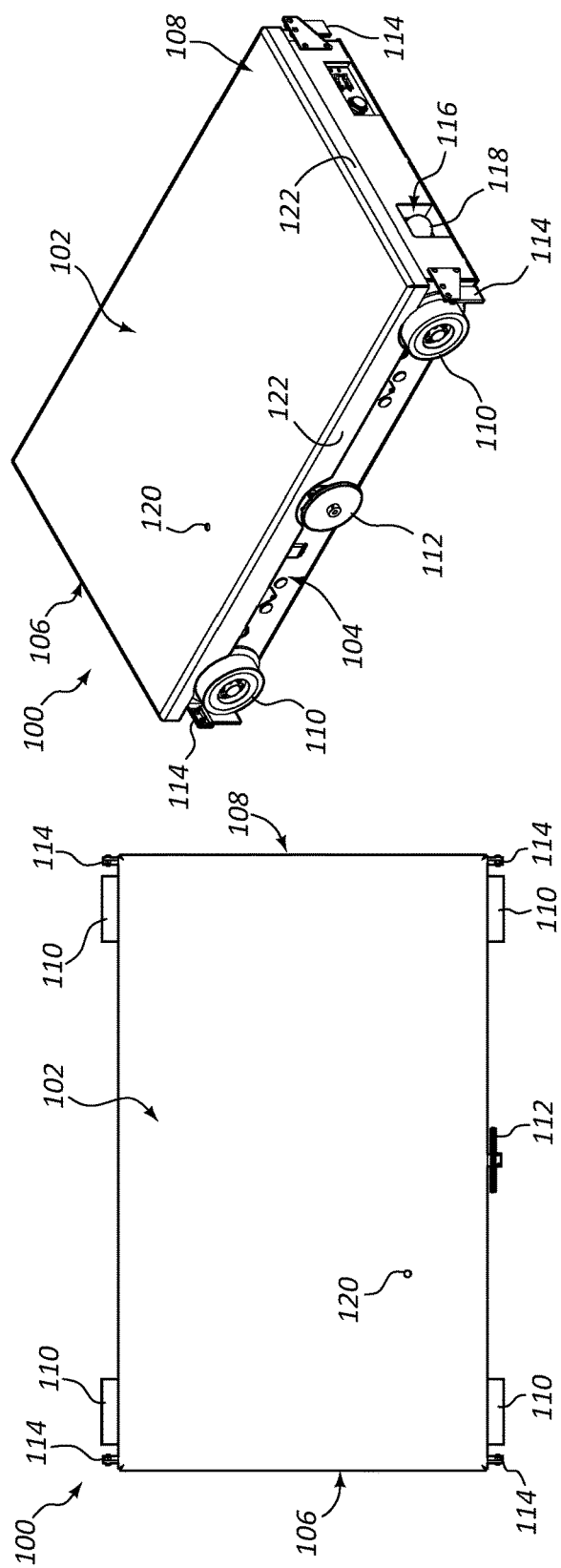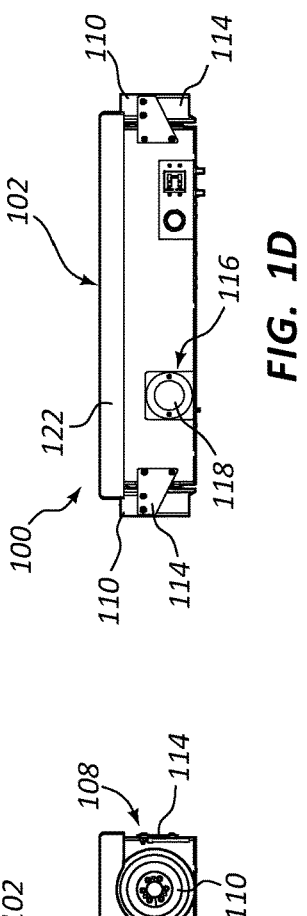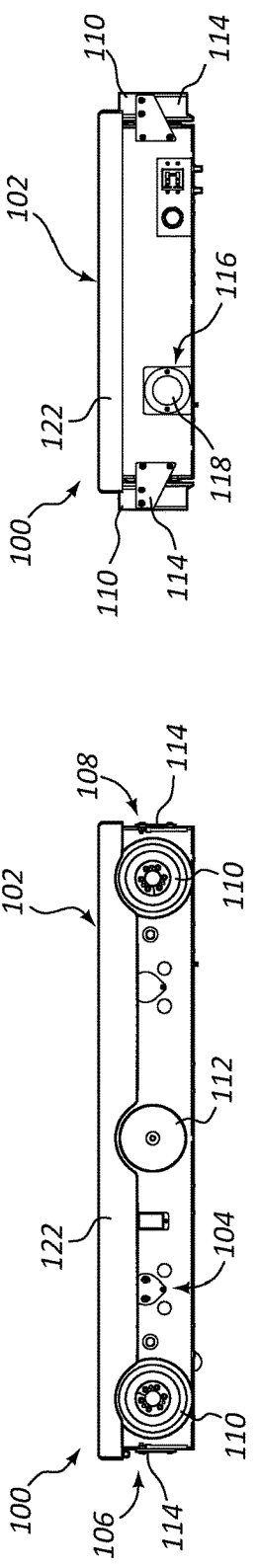

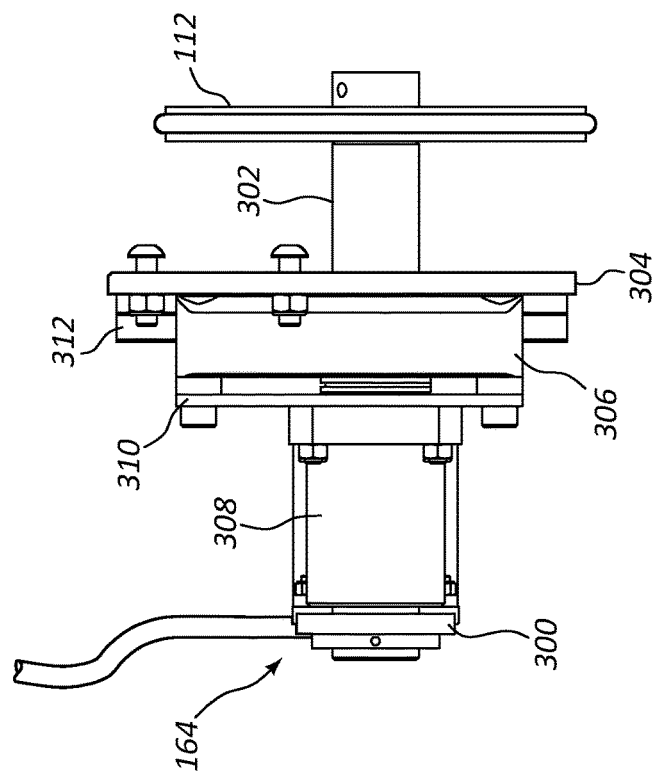
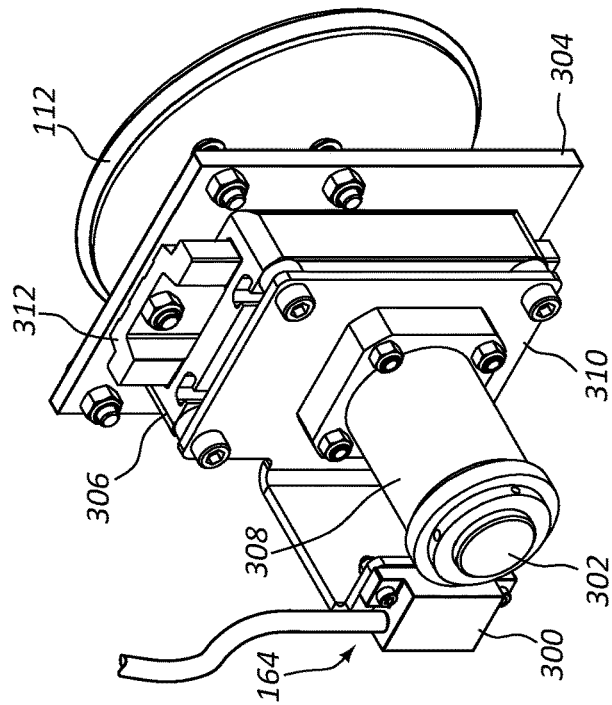
FIG. 3B
FIG. 3A

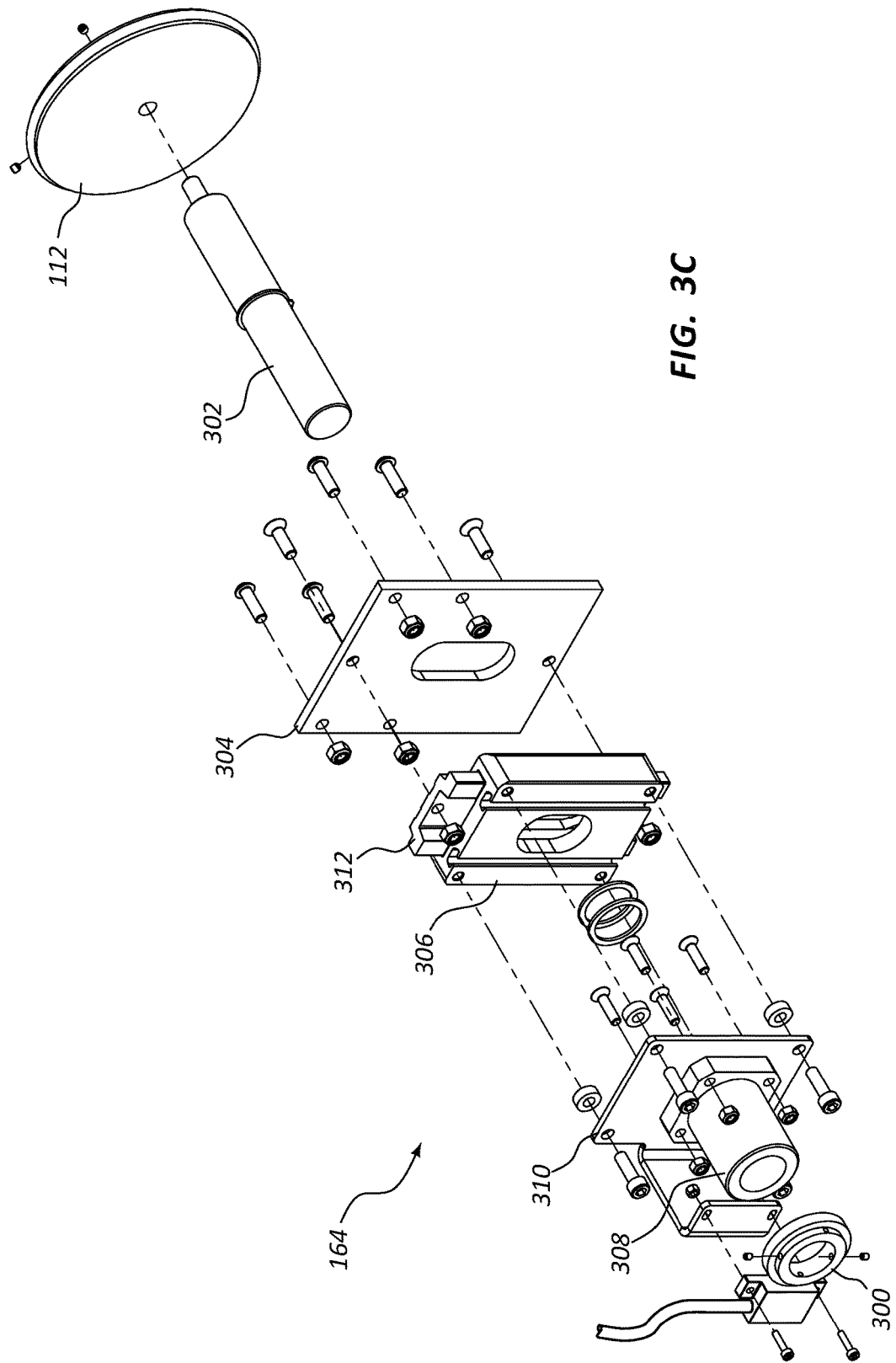

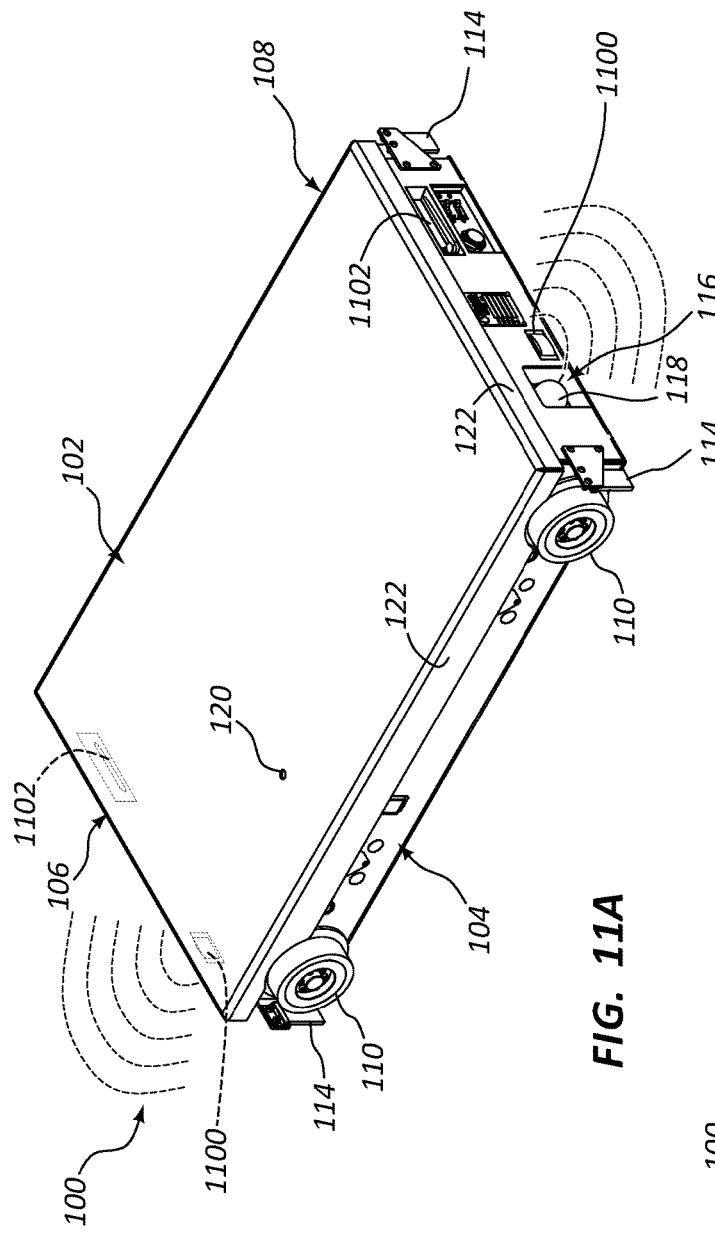
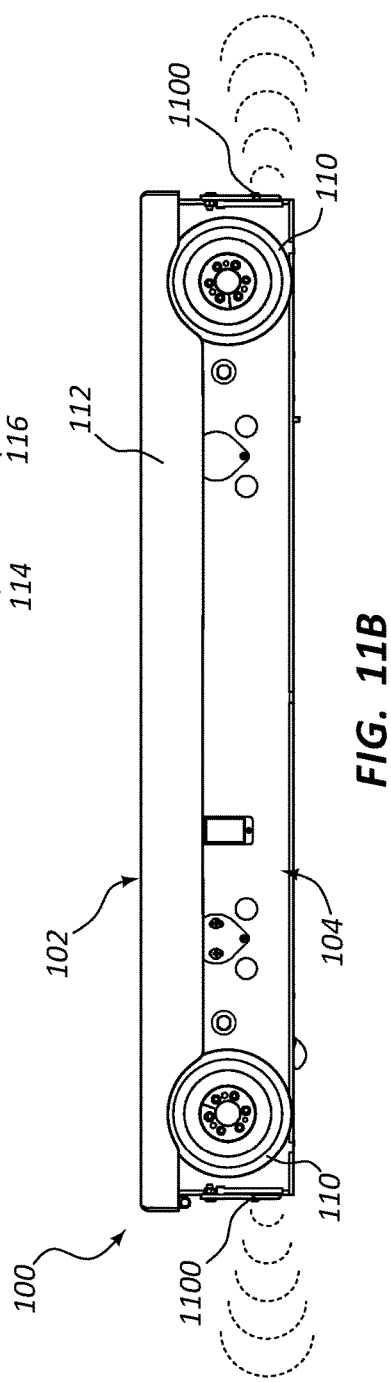
FIG. 11A
FIG. 11B ically to apparatus, palletized material in an automated warehouse.# APPARATUS FOR POSITIONING AN AUTOMATED LIFTING STORAGE CART AND RELATED METHODS

TECHNICAL FIELD

The following relates generally to automated storage and retrieval systems (AS/RS) and specifically to apparatus, systems, and methods for positioning an automated lifting storage cart in a railway for storing and accessing palletized material in an automated warehouse.

BACKGROUND

Automated warehouses and automated storage and retrieval systems (AS/RS) can reduce costs, pilferage, and damage in storing goods in part because far fewer workers are needed for otherwise similar operations. In typical AS/RS systems, a crane-like apparatus attached to the ceiling and floor of the warehouse is used to transport and position loads. Some systems have developed motorized carts which are used to transport, access, and store pallets of material in multi-story railed structures. For example, in a warehouse, a product on a pallet may be lifted and retracted into a loading elevator shaft by a forklift-like attachment (FLA). The load is transported to a desired level of the railway, removed from the elevator, and placed on a temporary pallet support near the elevator. Next, an aisle cart corresponding to the level where the load was transported moves underneath the load. A lifting row cart matched to the aisle cart is positioned on top of the aisle cart and actuates a lifting mechanism to remove the load from the temporary pallet support. The aisle cart then transports the load and row cart down the aisle to a designated row, where the row cart separates from the aisle cart while carrying the load down a row railway to the final destination of the load. When a load is retrieved from the storage structure, the process is reversed. These actions are typically all automated by a control center at the warehouse.

Some versions of these carts communicate with the control center via a tethered cable connection. The tethered cables act as a conduit for control signals being sent to the carts but also add substantial cost, weight, and maintenance burden.

Efficiently using storage space in a warehouse requires accurate tracking of the movements of the carts as they move loads and tightly pack them in the rows. Accurate positioning also improves safety for the products stored and the system itself, since incorrect positioning may lead to collisions of devices or products. The position of a row cart is typically determined by using an encoder that counts the rotations of a motor as the cart moves across the railway. The system tracks the encoder counts and determines the total distance traveled using a function of the encoder counts and a wheel radius of the cart. This method may produce error, however, since loading a cart may change the diameter of the wheels. For example, some carts use urethane wheels to improve grip, but they have a tendency to deform under a substantial load. The encoder is acceptably accurate in determining the distance traveled for an unloaded lifting cart since the wheels are normally shaped, but when the wheels are loaded by a heavy pallet and stored material, they may deform, reducing the wheel radius between the axle and the railway and thereby introducing error.

A loaded cart may have a wheel radius from an axle to the rail that is slightly smaller than an unloaded cart, so the distance traveled by one rotation of the wheel is slightly different. If the cart is instructed to deliver a load 10 meters down a railway from an aisle cart by moving 5,000 encoder counts it may actually end up slightly farther than 10 meters after 5,000 counts due to wheel deformation. As a result, the load may not be positioned at the precise location expected by the controller, and when the next load is positioned in that row, a collision may occur. Afterward, when the row cart is instructed to return 5,000 counts to its home position on the aisle cart, the row cart may end up 0.1 meters out of position since on the return trip the wheels are relatively unloaded.

Furthermore, the error introduced by wheel deformation may be inconsistent due to variations in the weight of palletized loads or temperature. The deformation may also vary from wheel to wheel on the same cart due to uneven palletized load weight distribution.

Steel wheeled row carts have much less deflection than those with urethane wheels, but they also have a tendency to slip on the rails, leading to problems of their own. Carts with steel wheels typically must undesirably move more slowly and inefficiently to avoid introducing encoder error.

DISCLOSURE OF THE INVENTION

According to at least one embodiment, a system for positioning a cart in an automated storage facility is presented. The system may include a cart and a controller. The cart may have a motor, wheels positioned on the cart to engage a railway, and an encoder reading a property of rotation of a rotating element of the cart. The motor may drive at least one of the wheels to propel the cart in the railway. The rotating element may rotate along with motion of the cart in the railway. The controller may be configured to receive the property of rotation of the rotating element from the encoder and convert the property of rotation into a rotation count of the rotating element.

In some arrangements, the controller may determine a distance traveled by the cart based on the rotation count. In some cases, the movement of the cart may be directed at least partially based on the distance traveled.

The system may also include a calibration surface positioned along the railway and a sensor positioned on the cart which may be used to sense the calibration surface as the cart traverses the railway. In this embodiment, the controller may be further configured to sense the calibration surface using the sensor, determine a position of the calibration surface sensed, and direct movement of the cart at least partially based on a difference between the position of the calibration surface and the distance traveled by the cart based on the rotation count.

In some configurations, the rotating element is synchronized in rotation with a drive shaft which drives at least one of the wheels. For example, the rotating element may be the drive shaft or another element synchronized in rotation with the drive shaft. The controller may determine the distance traveled by the cart based on the rotation count by a process including compensating for load deformation of the wheels. In some arrangements, the property of rotation may be a positional vector.

Additionally, the cart may comprise at least two drive sets. A first drive set may include the motor, at least one of the wheels, and the encoder. A second drive set may include a second motor, a second wheel, and a second encoder. Here, the encoder reads a property of rotation of the rotating element, and the second encoder reads a property of rotation of a rotating element associated with the second wheel and the second motor. The output of the two encoders may then be used to synchronize the movement of each drive set or to minimize error which may be caused by one of the drive sets.

The cart may also have an encoder wheel that is not driven by the motor but is positioned to contact the railway simultaneously with the wheels driven by the motor. The encoder wheel may be linked to the cart by an encoder shaft which acts as the rotating element. In some of these embodiments, the encoder wheel may have a suspension separate from the wheels driven by the motor.

In some embodiments, the controller is positioned on the cart. In other embodiments the controller may additionally include a first transceiver in communication with the controller, and the cart may include a second transceiver receiving the property of rotation from the encoder. Thus, the controller may receive the property of rotation of the rotating element from the encoder via a communication link between the first and second transceivers. The cart may have two transceiver antennae, one at each end of the cart, where each antenna is configured to communicate with the second transceiver. These antennae may also be configured to allow the second transceiver to communicate with the first transceiver from either side of the cart.

In another example embodiment, a system for positioning a storage cart in an automated facility includes a railway having a structure facing a travel route of the railway, a cart, and a controller. The cart may include wheels positioned to engage the railway, a motor to drive at least one of the wheels to propel the cart in the travel route, a signal emitter positioned on the cart and operable to emit a signal from the cart towards the travel route of the railway, and a signal sensor positioned on the cart and operable to sense a reflection of the signal. The controller may be configured to direct the signal emitter to emit the signal, receive an output of the signal sensor, and determine a distance from the cart to the structure based on the output of the signal sensor.

In some embodiments the signal is a rangefinding laser, the signal emitter is a laser emitter, and the signal sensor is a laser detector. In such cases, the structure may be a reflector facing the travel route of the railway. Additionally, the railway may include multiple reflectors positioned along at least one side of the travel route and the laser detector is configured to sense the reflection of the rangefinding laser from at least one of the many reflectors.

The system may also comprise multiple signal emitters, wherein at least one of the signal emitters may emit a signal in a first direction from the cart and another signal emitter may emit a signal in a second direction from the cart. Additionally, multiple signal sensors may be on the cart, wherein at least one may be operated to sense a reflection of the signal coming from a first direction and another may be operated to sense a reflection of the signal from a second direction.

In some configurations, the railway may include a first structure at a first end and a second structure at a second end. The signal emitter may thus be operable to emit the signal toward the first structure or toward the second structure, and the signal sensor may be operable to sense the reflection from the first structure or from the second structure. In at least some embodiments, the structure may be positioned at an end of the travel route of the railway. The structure may also be a railway surface or a load positioned along the railway.

The system may at least partially control a positional vector of the cart based on the distance determined.

Additionally, the signal of the system may be a sonic signal, the signal emitter may be a sonic emitter, and the signal sensor may be a sonic sensor. Thus, the system may use acoustic location or distance detection technology such as ultrasonic positioning.

In another embodiment, a system for positioning the cart in an automated storage facility may include a railway having a structure facing a travel route of the railway, a cart, and a controller. The cart may have a motor, wheels positioned to engage the railway, and a photo sensor. The photo sensor may be positioned on the cart and operable to obtain an image of the structure facing the travel route of the railway. The controller may be configured to follow a process including obtaining a first image from the photo sensor at a first time and obtaining a second image from the photo sensor at a second time. After obtaining the first image, the controller may detect a pattern in a first position in the first image and detect the same pattern at a second position in the second image. The controller may then determine an image distance between the first position and the second position and calculate a distance traveled by the cart between the first time and the second time based on the image distance and a predetermined calibration distance.

In this system, the second time may occur after the first time within a range extending between about 1 millisecond and about 100 milliseconds. The pattern may be a shape on a surface of the structure facing the travel route of the railway. A light source may be included on the cart to illuminate the structure at least when the photo sensor obtains images. The structure may be a side face of a rail.

The predetermined calibration distance may be based on the field of view (FOV) of the photo sensor, and a positional vector of the cart may be at least partially controlled based on the distance determined by the controller.

In another arrangement, a method of controlling a cart in an automated storage facility may include providing a cart in a railway, instructing the cart to move along the railway toward a destination position, determining the position of the cart at least once while it moves along the railway, and sending an instruction to the cart based on the position determined. To determine the position of the cart, a portion of the railway may be referenced. In one example, referencing the portion of the railway may include receiving a reflection from the portion. In another example, referencing the portion of the railway may include obtaining an image of the portion.

The foregoing and other features, utilities and advantages of the invention will be apparent from the following more particular description of preferred embodiments of the invention and as illustrated in the accompanying drawings.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

FIG. 1A is a perspective view of a lifting cart with a lid shown closed in accordance with an exemplary embodiment of the present disclosure.

FIG. 1B is a top view of the lifting cart of FIG. 1A.

FIG. 1C is a left side view of the lifting cart of FIG. 1A.

FIG. 1D is a rear end view of the lifting cart of FIG. 1A.

FIG. 3A is a perspective view of an encoder wheel assembly and internal encoder according to an exemplary embodiment of the present disclosure.

FIG. 3B is a right side view of the encoder wheel assembly and internal encoder of FIG. 3A.

FIG. 3C is an exploded perspective view of the encoder wheel and internal encoder of FIG. 3A.

FIG. 11A is a perspective view of a lifting cart having ultrasonic emitters and ultrasonic sensors according to an embodiment of the present disclosure.

FIG. 11B is a side view of the lifting cart of FIG. 11A.

Figure 1E:
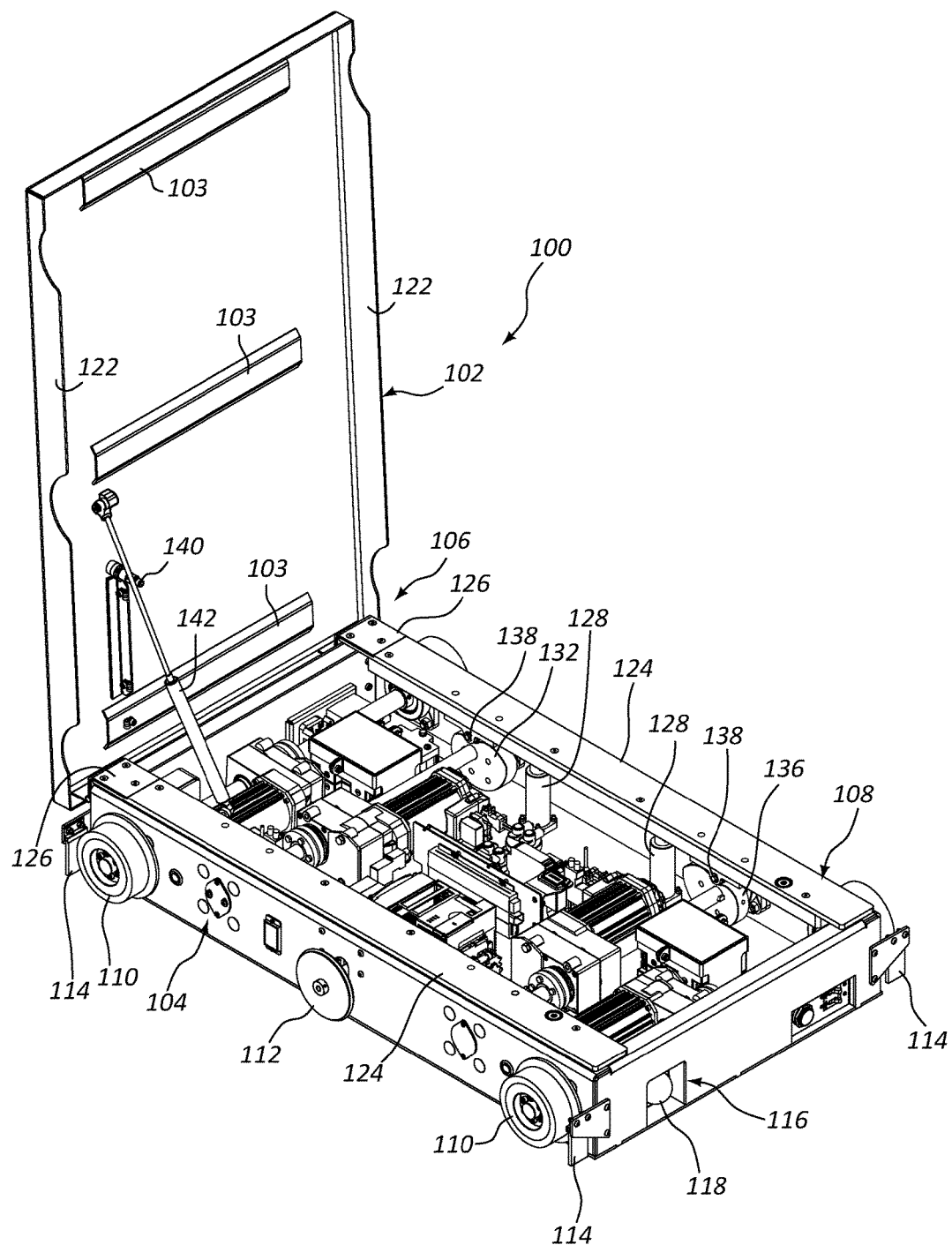
FIG. 1E is a perspective view of the left side of the lifting cart of FIG. 1A with the lid shown open.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

BEST MODE(S) FOR CARRYING OUT THE INVENTION

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. The methods described may be performed in an order different from that described, and various steps may be added, omitted, or combined. Also, features described with respect to certain embodiments may be combined in other embodiments. For example, various methods and systems disclosed herein for positioning a lifting cart may be combined in some embodiments, such as a dual-antenna system combined with a fifth wheel encoder system.

Embodiments of the present disclosure may provide systems, apparatus, and methods for positioning an automated lifting storage cart. An automated lifting storage cart may be a rail cart referred to herein as a row cart, row rail cart, aisle rail cart, or an aisle cart based on the exemplary embodiments disclosed herein related to AS/RS systems, but the principles and teachings of the present disclosure may be applied and adapted to railed vehicles in any environments, including, but not limited to, trains, roller coasters, road-rail vehicles, and other railed vehicles and railway-traveling devices. Some embodiments may show or describe a row cart, but features and embodiments of an aisle cart or related other cart in a railway system may be interchangeable with the features of a row cart. Thus, a "lifting cart" may be a row cart or an aisle cart. While some embodiments may refer to a lifting cart having urethane wheels, the scope of the present disclosure extends carts having wheel compositions of all kinds, including, for example, polymers (including urethane), metals, ceramics, composite materials, combinations of these materials, or other suitable materials.

In at least one embodiment, a system for positioning a lifting cart may include a lifting cart and a controller. The lifting cart may have motorized wheels that engage the railway of a storage area in an automated storage facility and may be configured to move about portions of the railway to lift, transport, and reposition loads (e.g., palletized loads). The controller may be an automated computer system or control station located at the storage facility, such as a central control station or a computer system onboard the lifting cart. The control system may send control signals to the cart periodically, such as every few seconds, or substantially continuously.

An encoder may be used to read a property of rotation of a rotating element of the lifting cart, such as an encoder wheel rotating in contact with the railway, an encoder shaft, a drive shaft, or a motor output. The rotating element may rotate along with motion of the cart in the railway. Thus, the rotating element may rotate when the cart is in motion or in response to motion of the cart. For example, the rotating element may be a gear attached to a drive shaft that starts and stops motion concurrently with the drive shaft. Typically, the rotating element would then not rotate when the cart is not in motion, but in some embodiments the rotating element may have asynchronous cessation of movement. For example, the lifting cart may include a flywheel element on a drive shaft, and a motor may drive the movement of the flywheel instead of the drive shaft directly, so if the rotating element is the output of the motor, the cart may not stop immediately in synch with the stopping of the motor's rotating element due to the flywheel coasting to a stop afterward.

The controller may receive the output of an encoder (e.g., a positional vector such as angular displacement, angular velocity, and/or angular acceleration) and determine a rotation count. The controller may then convert the rotation count into the distance traveled by the lifting cart. If there is load deformation of the wheels of the cart, the controller may adjust the distance traveled in accordance with a modified wheel radius or based on calibration through photo sensors, signal emitters, or other apparatus described herein. Thus, the conversion between a rotation count of the encoder and the distance traveled by the cart may compensate for load deformation of the wheels. If an encoder wheel is used, it may be independently suspended from other wheels or may be designed to not be subjected to deformation by the load on the lifting cart, so little or no adjustment may be required. Thus, the cart, and loads transported by it, may be more accurately positioned in the railway. The encoder wheel may be driven by the motor, meaning it rotates in response to a connection in the cart between the output of the motor and the encoder wheel. However, in typical embodiments (e.g., the cart 100 of FIGS. 1A-1G) the encoder wheel is not driven by the motor, meaning it rotates due to contact with the rail as the cart moves, but not because it is connected to the output of the motor.

In some embodiments, correction of error in the position of a lifting cart may be facilitated by calibration points at various positions in the railway or by supplemental positioning means. In one example embodiment, reflectors may be mounted in the railway at predetermined intervals. For example, a pair of reflectors may be positioned at one meter from a "home position" in the railway, and another pair of reflectors may be positioned at ten meters into the railway. The lifting cart may be equipped with a photo sensor or camera positioned to detect when the cart reaches each pair of reflectors. If the encoder count of the lifting cart is different than expected upon reaching each pair of reflectors, the controller may adjust the commands to the cart in accordance with the offset caused by the load.

In another example embodiment, a wireless connection between the lifting cart and the controller may be established by a transceiver on the lifting cart and another transceiver in the warehouse connected to the controller. This configuration may reduce the cost and weight of the cart that would otherwise be required in a cable-tethered system. In such a system, a lifting cart may enter "dead spots" where communication between the cart and the controller is lost or subject to interference. The lifting cart may therefore be outfitted with a transceiver on each side of the lifting cart to minimize the presence and impact of the dead spots. This gives the controller more reliable monitoring of the positioning of the lifting cart and can therefore reduce loss of control or mispositioning of the cart or loads delivered by it.

Figure 1F:
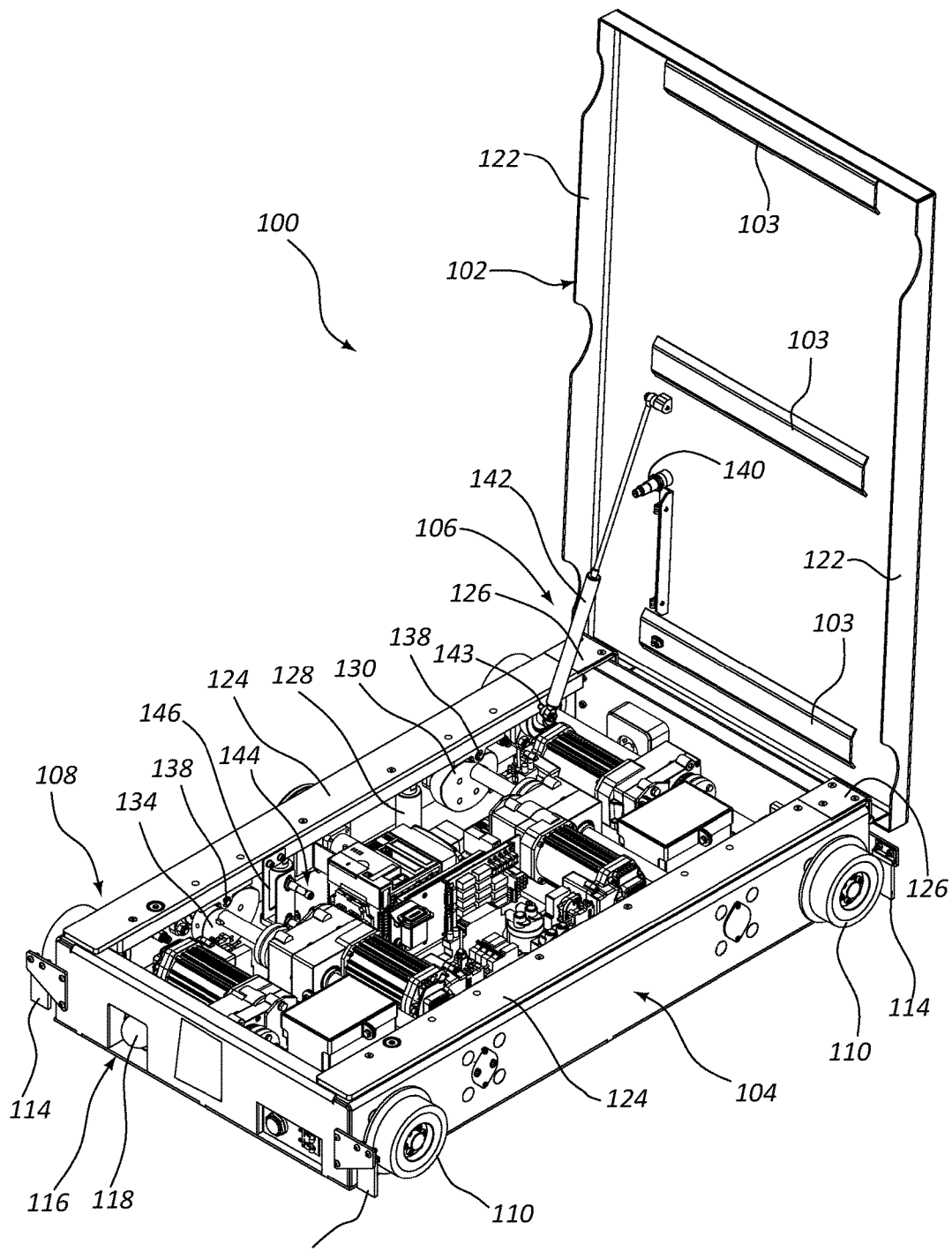
FIG. 1F is a perspective view of the right side of the lifting cart of FIG. 1E.
Figure 1G:
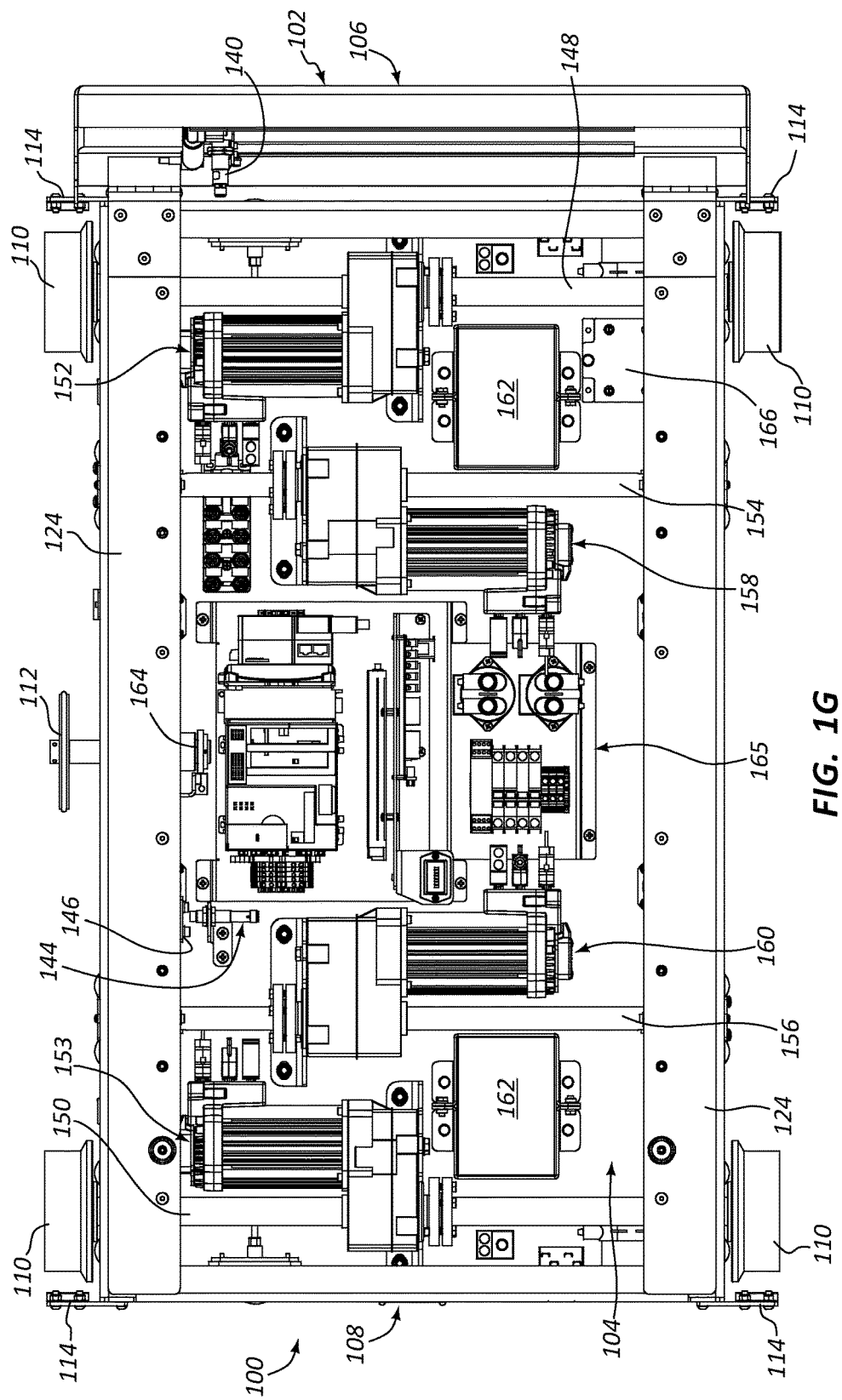
FIG. 1G is a top view of the lifting cart of FIG. 1E.

Additional embodiments and features will be discussed or apparent in connection with the figures and the following detailed description. FIGS. 1A-1G show various views of a lifting cart 100, specifically a row rail cart (RRC), having various features of the present systems, apparatuses, and methods. FIGS. 1A-1D show views of the lifting cart 100 with a lid 102 shown closed. FIG. 1A is a perspective view, FIG. 1B is a top view, FIG. 1C is a left side view, and FIG. 1D is rear side view. FIGS. 1E-1G show views of the lifting cart 100 with the lid 102 in an open position. FIGS. 1E and 1F are perspective views of the left and right sides of the cart 100, respectively, and FIG. 1G is a top view.

Referring in particular to FIGS. 1A-1D, the cart 100 includes a base enclosure 104 having a front end 106 and rear end 108. Four drive wheels 110 and an encoder wheel 112 may extend laterally from the sides of the cart 100. Brush assemblies 114 may be positioned adjacent to the drive wheels 110. The front and rear ends 106, 108 may include inset housings 116 for transceiver antennae 118. The lid 102 may include a port 120 for a photo sensor 140 (see infra, FIG. 1E and related description).

The lid 102 may be an at least generally planar structure acting as a support surface for a pallet, load, palletized load, or other material or load to be lifted by the lifting cart 100. A generally planar top surface of the lid 102, may provide versatility in the kinds of loads lid 102 can carry. In some embodiments the lid 102 may be fluted, formed with ridges, or include protrusions or other structural elements to improve the rigidity, strength, weight distribution, and/or security of retention of a load on its top surface. For example, the lid 102 may include surface features shaped to fit between slats in a pallet, thereby preventing rotation of the load while borne by the lifting cart 100. See also FIGS. 1E-1F showing reinforcements 103 on the underside of the lid 102. The lid 102 may comprise side surfaces 122 extending around at least a portion of the perimeter of the top surface of the lid 102 which provide protection to the lid 102 and components underneath the lid 102. The lid 102 may be lifted substantially vertically relative to the base enclosure 104 by cams 130, 132, 134, 136 within the base enclosure 104 (see infra, FIGS. 1E, 1F, and related description). While lifted, the side surfaces 122 may cover clearance between the lid 102 and the base enclosure 104 created by the movement of the lid 102. In some embodiments the side surfaces 122 may have cutout portions to prevent interference with the drive wheels 110, brush assemblies 114, the encoder wheel 112, and/or other elements on the sides of the base enclosure 104.

The base enclosure 104 may be substantially rectangular in shape, as shown in the figures, but may also have another shape. The base enclosure 104 houses many of the components of the lifting cart 100, and therefore may be constructed of a tough, rigid material such as, for example, steel or aluminum. In some embodiments, the base enclosure 104 may be reinforced by fluting, corrugations, layers, composite layers, and the like to improve rigidity and/or reduce weight. Specifically, openings in the base enclosure for the drive wheels 110, axles connected thereto, or other external components may be reinforced to improve structural integrity. The base enclosure 104 may be positioned below the lid 102. The base enclosure 104 may also be referred to as a housing chassis.

The drive wheels 110 may extend outward from the sides of the base enclosure 104 to a position configured to engage the railway in which the lifting cart 100 will be operated. In some embodiments the drive wheels 110 may beneficially comprise urethane or another similar polymer providing grip for the lifting cart 100 when running along metal (e.g., steel) rails. For example, the drive wheels 110 may be entirely urethane. In another example, the drive wheels may comprise a steel core with a urethane rail contact surface that extends around the circumference of the wheel that contacts the railway. Such steel-reinforced drive wheels 110 may beneficially provide less deformation under load than entirely urethane wheels while still providing improved grip over all-steel wheels.

Drive wheels 110 comprising urethane and other similar materials may generate static electricity while rolling on steel railways, and brush assemblies 114 may therefore in some embodiments be provided to dissipate static buildup. The brush assemblies may be configured of a material that disperses static electricity or collects static electricity for providing additional charge to, for example, batteries in the lifting cart 100. In some configurations the brush assemblies 114 may clear the railway of dust and debris, thereby improving the consistency of traction of the drive wheels 110 and encoder wheel 112. The brush assemblies 114 may therefore be positioned to the front of the drive wheels 110 of the front end 106 and positioned to the rear of the drive wheels 110 of the rear end 108.

An encoder wheel 112 may extend outward from the side of the base enclosure 104. In some embodiments the encoder wheel 112 may be vertically oriented (e.g., as shown in FIG. 1A), and in some embodiments it may be horizontally oriented, extending below or to the side of the base enclosure 104 or through a slot in the base enclosure 104 to come into contact with the railway. The encoder wheel 112 may beneficially be comprised of a rigid material that maintains grip to the railway as the lifting cart 100 moves. For example, the encoder wheel 112 may beneficially have a urethane or rubber outer surface to maintain friction with the railway. The encoder wheel 112 may alternatively be referred to as a fifth wheel of the lifting cart 100 or as an element of a fifth wheel encoder of the lifting cart 100. In some arrangements the encoder wheel 112 may have an independent suspension from the drive wheels 110. In these arrangements the encoder wheel 112 thereby may not be subject to the load on the lid 102 that is borne by the drive wheels 110 which may cause them to deform. The lack of deformation of the encoder wheel 112 may provide a reliable determination of distance traveled by the lifting cart 100, even when under load. The encoder wheel 112 may maintain its shape characteristics after the load is removed as well.

The transceiver antenna 118 may provide communication between the lifting cart 100 and an external controller or monitor system via another transceiver connected thereto. In such embodiments, a "transceiver" may refer to a transmitter, a receiver, or a transmitter/receiver. The transceiver antenna 118 may be part of an electromagnetic transceiver system, such as a radio frequency (RF) system, a global positioning system (GPS), a wireless network connection (e.g., wi-fi), a Bluetooth or Zigbee connection, or related wireless communication systems. In some embodiments the transceiver antenna 118 may be connected to a controller internal to the base enclosure 104. A transceiver antenna 118 may be located at the front end 106 and the rear end 108 of the base enclosure 104 to provide communication to an external central controller transceiver no matter which side of the base enclosure 104 the external transceiver is located. In some embodiments transceiver antennae 118 may be positioned to the left, right, top, or bottom sides of the base enclosure 104, depending on the characteristics of the wireless communications field in which the cart 100 is located. Transceiver antennae 118 may be placed in a recessed inset housing 116 to minimize the risk of damage to the antennae 118 and/or to reduce the outside clearance required by the lifting cart 100 in narrow railways and aisle cart retaining means.

Referring now in particular to FIGS. 1E-1F, internal components of the lifting cart 100 are shown when the lid 102 is in a vertical orientation. Support surfaces 124 are shown immediately below the underside of the lid 102 and support the lid 102 when it is in its horizontal orientation. The lid 102 may be pivoted from the position shown in FIG. 1A where it is in contact with the support surfaces 124 to the position shown in FIG. 1E due to hinges 126 connecting the lid 102 to the support surfaces 124 at the front end 106 of the base enclosure 104. The hinges 126 may provide easy access to the internal components of the base enclosure 104 for repair, maintenance, replacement, and related tasks without needing to remove bolts or completely remove the lid 102. In some embodiments the hinges 126 may be connected to one or more the side surfaces 122 of the lid 102. The hinges 126 are preferably not connected to the base enclosure 104 to allow the lid 102 to move relative to the base enclosure 104 on top of the support surfaces 124.

The support surfaces 124 may be generally flat support beams running horizontally across the lifting cart 100 from front to back. The support surfaces 124 may be linked to the base enclosure 104 by two vertical stabilizer bearings 128 on each side of the cart 100. Only one of the stabilizer bearings 128 is viewable in FIG. 1F. The vertical stabilizer bearings 128 may orient the support surfaces 124 to be level and move relative to the base enclosure 104 in only a substantially vertical direction. In this fashion, the support surfaces 124 and lid 102 remain level when lifted by the cams 130, 132, 134, 136 and do not move laterally relative to the base enclosure 104.

Two front cams 130, 132 and two rear cams 134, 136 move the support surfaces 124 from below cam followers 138 attached to the underside of the support surfaces 124. See also FIG. 1F. In the embodiment shown, each support surface 124 may be linked to one cam of the pair of front cams 130, 132 and one cam of the pair of the rear cams 134, 136. In some embodiments one support surface 124 may be linked to both front cams and the other support surface 124 may be linked to both rear cams. In yet further embodiments, the support surfaces 124 may be linked to each other, such that the resulting single support surface is movable by four cams at once.

The underside of the lid 102 shows a photo sensor 140. The photo sensor 140 may sense light coming through the port 120 (see FIG. 1A) and thereby be used to determine if the cart 100 is underneath a pallet or other material due to shadows cast on the lid 102 by the pallet or other material. In some embodiments the photo sensor 140 may be replaced by a proximity sensor such as, for example, an ultrasonic or laser rangefinder, to determine the distance between the lid 102 and the underside of a load positioned above the lid 102. In some embodiments, the photo sensor 140 projects its own light and then detects a reflection or diffusion of that light to determine whether a pallet or other material is placed on the lid 102.

An extendable gas spring 142 may be linked to pivot points on the underside of the lid 102 and an inner surface connection point 143 of one of the support surfaces 124 (see FIGS. 1E-1F). The gas spring 142 may pneumatically assist in opening and holding up the lid 102 while it is pivoted upward and then allow the lid 102 to return to a horizontal position. In some embodiments the gas spring 142 may dampen the movement of the lid 102 while it is opened or closed. In the embodiment shown in FIG. 1G, the gas spring 142 is shown disconnected from the pivot points of the inner surface connection point 143 and lid 102.

The vertical position of the support surface 124 relative to the base enclosure 104 may be sensed by a pair of proximity sensors 144. (See also FIGS. 5A and 5B.) The proximity sensors 144 are attached to the base enclosure 104 and are configured to detect the position of a position member 146 attached to the side of a support surface 124 that moves along with the support surface 124. Multiple proximity sensors 144 may be implemented in order to improve the accuracy of measuring the position of the support surfaces 124. When the lid 102 and support surfaces 124 are in a lowered position, the position member 146 is detected as being near the bottom proximity sensor 144, and when the lid 102 and support surfaces 124 are raised, the position member 146 is moved to align with the upper proximity sensor 144. The dual proximity sensors 144 verify the raised or lowered position of the support surfaces 124. In some embodiments, the lower proximity sensor confirms whether the position member 146, and therefore the support surfaces 124 are properly in their lowered position. The upper proximity sensor confirms whether the position member 146 and support surface 124 are in the raised position. If only one proximity sensor 144 was used, there would be no way for the controller to definitively confirm whether the support surfaces 124 are in their maximum highest or lowest positions, and problems can arise if there is a jam in the system that goes unnoticed.

FIG. 1G shows the front drive shaft 148 and rear drive shaft 150 attached to the drive wheels 110. The drive shafts 148, 150 are respectively driven by a front drive motor 152 and rear drive motor 153. A front cam shaft 154 and rear cam shaft 156 drive the cams 130, 132, 134, 136 (see FIGS. 1E-1F). The cam shafts 154, 156 are respectively driven by a front cam motor 158 and a rear cam motor 160. In some embodiments, the motors 152, 154, 158, 160 may beneficially be hollow bore gear motors. In such embodiments, the motors 152, 154, 158, 160 may directly drive the motion of each pair of wheels or cams without mechanical drive losses that would be present in a system having a single motor and a drive train transferring power to each drive shaft 148, 150 collectively (e.g., via a chain and sprocket on each drive shaft 148, 150). Also, fewer parts mean that the drive system may be more reliable and have improved mean time between failures (MTBF), with reduced maintenance time and cost. A set of a drive motor (e.g., front drive motor 152), a wheel (e.g., one of the drive wheels 110), and an encoder (e.g., an encoder on the front drive motor 152 or front drive shaft 148) may collectively be referred to as a drive set. In some embodiments, a drive set may also include a rotating element, such as, for example, a drive shaft.

The encoder wheel 112 is connected to an internal encoder 164. See also FIGS. 3A-4B.

Two battery enclosures 162 each hold at least one battery or other energy storage device which may provide power for the motors 152, 154, 158, 160. Control electronics 165 within the lifting cart 100 may be powered by batteries in the battery enclosures 162 and may manage control over driving the motors 152, 154, 158, 160 in response to control signals received via the transceiver antennae 118, sensors (e.g., proximity sensors 144, internal encoder 164, and photo sensor 140), or preprogrammed instructions. In some arrangements the control electronics 165 may also perform calculations and computations, such as, for example, converting the measurements of the internal encoder 164 into a rotation count of the encoder wheel 112 or determining a distance traveled by the lifting cart 100 based on the rotation count. A contactor assembly 166 may be included in the base enclosure 104 as a connection point for recharging batteries in the enclosures 162. The contactor assembly 166 may extend through the underside of the base enclosure 104 to contact charging terminals below the lifting cart 100, such as, for example, on a top surface of an aisle cart or another charging station.

Figure 2A:
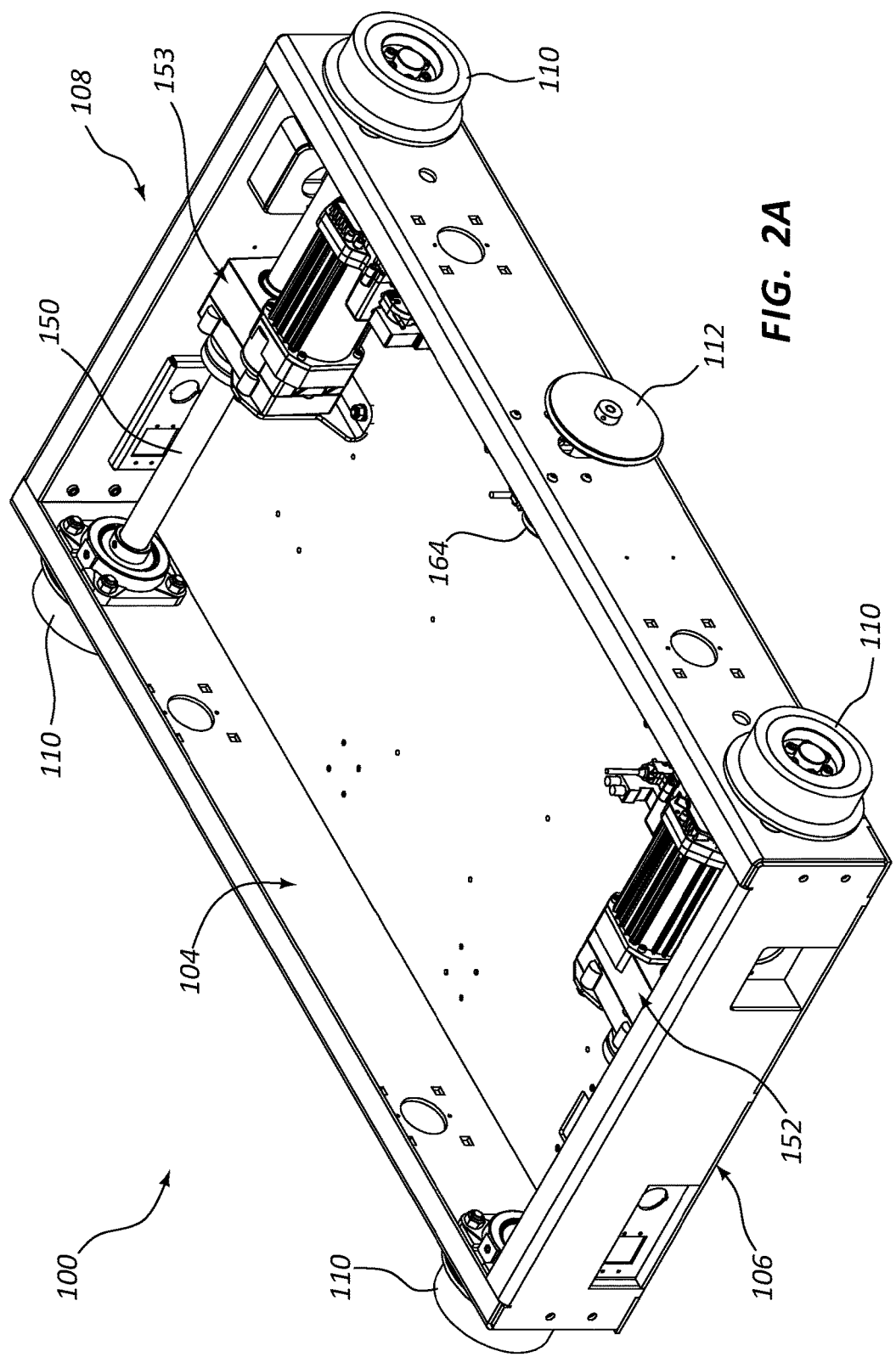
FIG. 2A is a perspective view of the front-left side of a simplified view of a lifting cart in accordance with an exemplary embodiment of the present disclosure.
Figure 2B:
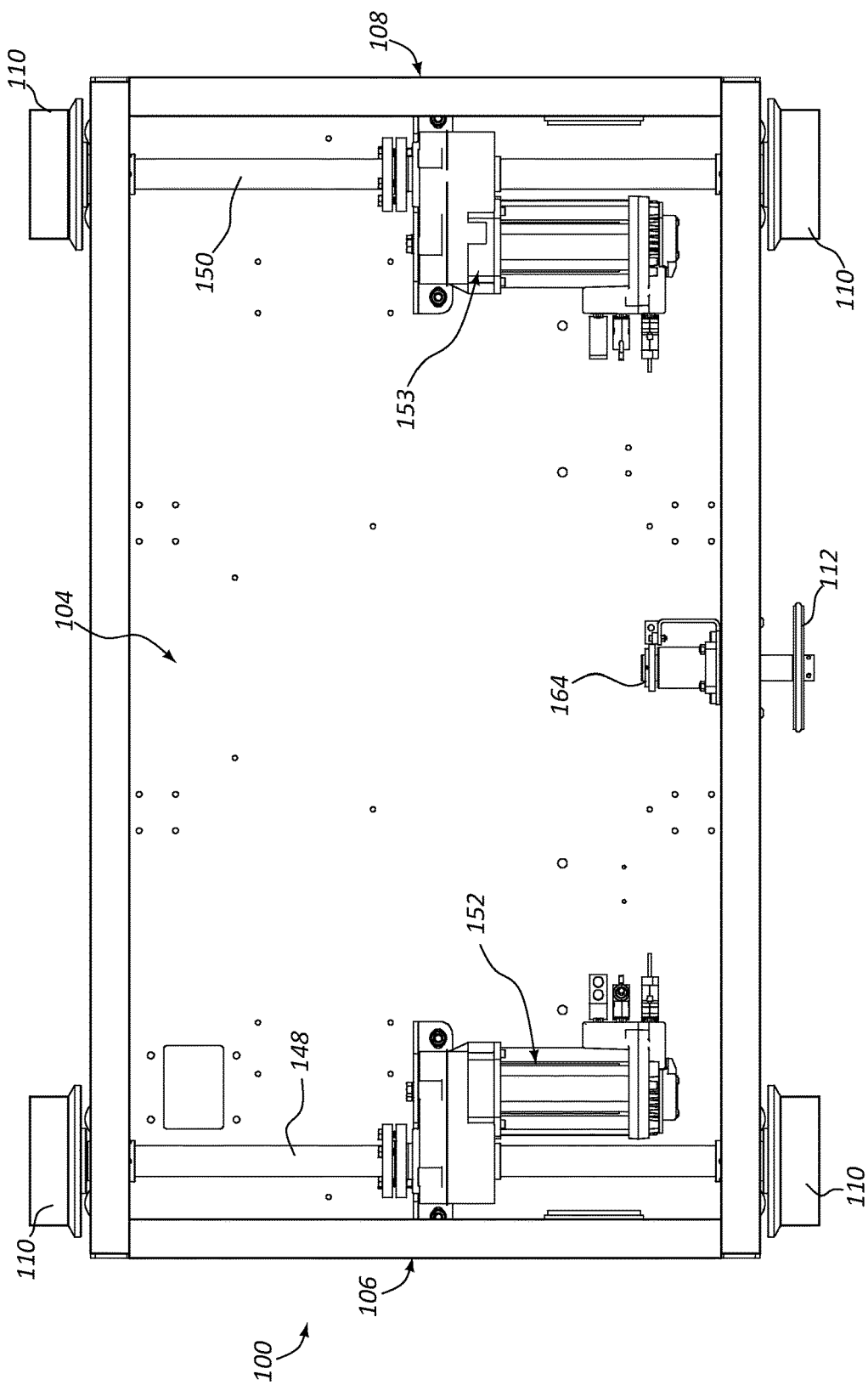
FIG. 2B is a top view of the lifting cart of FIG. 2A.
Figure 2C:
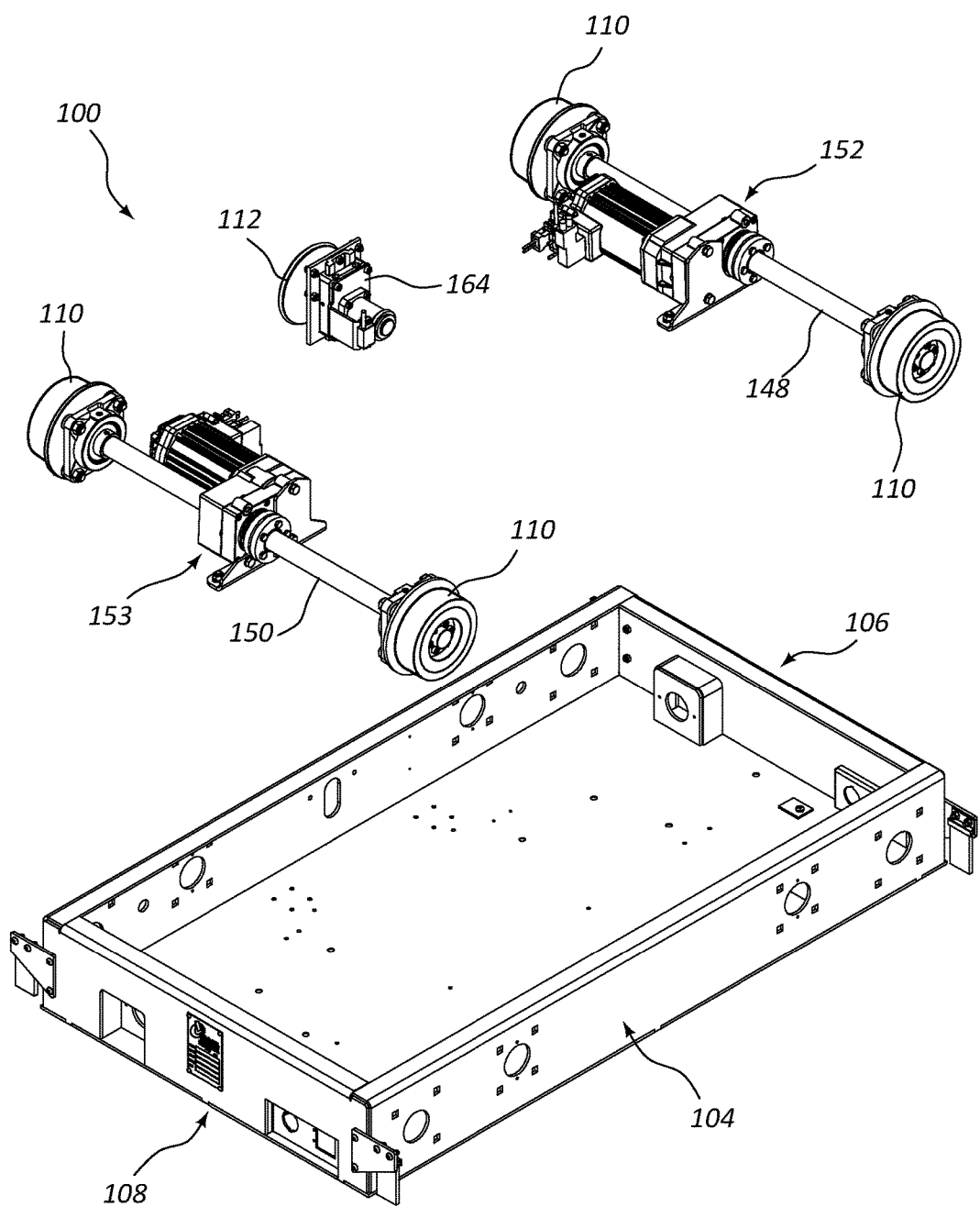
FIG. 2C is an exploded rear-right perspective view of the lifting cart of FIG. 2A.

FIGS. 2A-2C show simplified views of the lifting cart 100 where drive and encoder components are isolated in the assembly, including the base enclosure 104, drive wheels 110, encoder wheel 112, drive shafts 148, 150, drive motors 152, 153, and internal encoder 164. FIG. 2A is a perspective view of the front-left side of the cart 100, FIG. 2B is a top view, and FIG. 2C is an exploded rear-right perspective view. These figures clearly show the hollow bore of the drive motors 152, 153 and the independent rotation and encoding of the encoder wheel 112. These figures also show that the front drive wheels 110 have synchronized rotation driven by the front drive motor 152 alone, and that the rear drive wheels 110 have the same feature due to the rear drive motor 153 driving them independent from the front drive wheels 110.

FIGS. 3A-3C are views of the encoder wheel 112 and internal encoder 164 according to one exemplary embodiment. FIG. 3A shows an assembled perspective view, FIG. 3B shows a right side view, and FIG. 3C shows an exploded perspective view. As seen in these figures, the encoder wheel 112 may be connected to an incremental encoder 300 via an encoder shaft 302. The encoder shaft 302 or encoder wheel 112 may be referred to as a rotating element of the lifting cart. The encoder shaft 302 extends through a slide mount 304, a rail carriage 306, a bearing 308, and a rail 312. The bearing 308 may provide smooth rotation for the encoder shaft 302 and thereby minimize slippage of the encoder wheel 112. The bearing 308 may also prevent the encoder shaft 302 from bending or tilting in response to forces applied to the encoder wheel 112. The bearing 308 may be attached to the rail carriage 306 using a plate 310. The rail carriage 306 may be slidably attached to the rail 312. The rail 312 and slide mount 304 may allow the rail carriage 306, and therefore the encoder wheel 112, to slide vertically in response to uneven contact between the encoder wheel 112 and the railway. In this manner, the encoder wheel 112 may be independently suspended in comparison to the drive wheels 110. In some embodiments, the slide mount 304 may be a sidewall of the base enclosure 104.

Figure 4A:
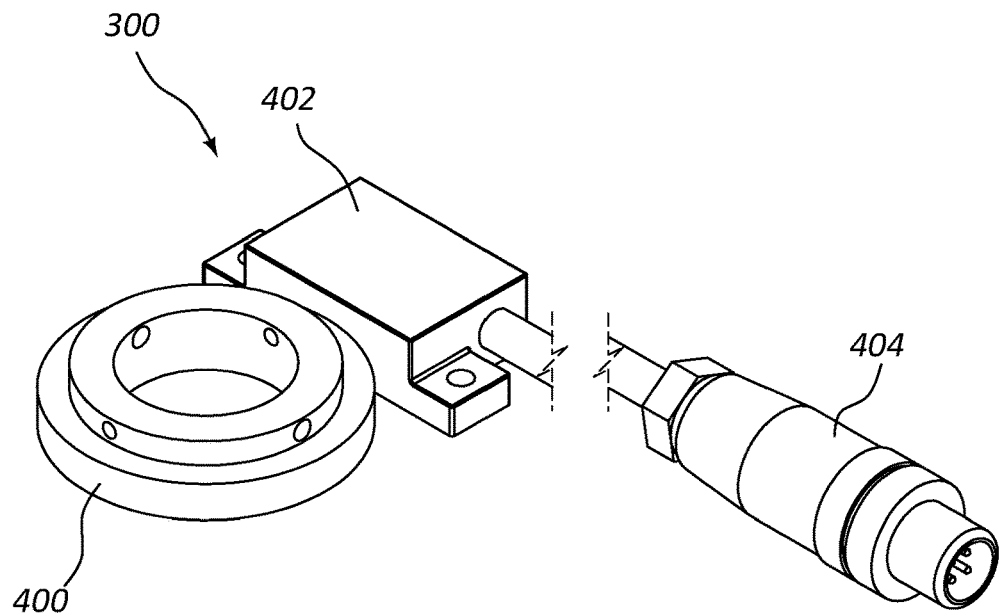
FIG. 4A is a perspective view of an incremental encoder according to an exemplary embodiment of the present disclosure.
Figure 4B:
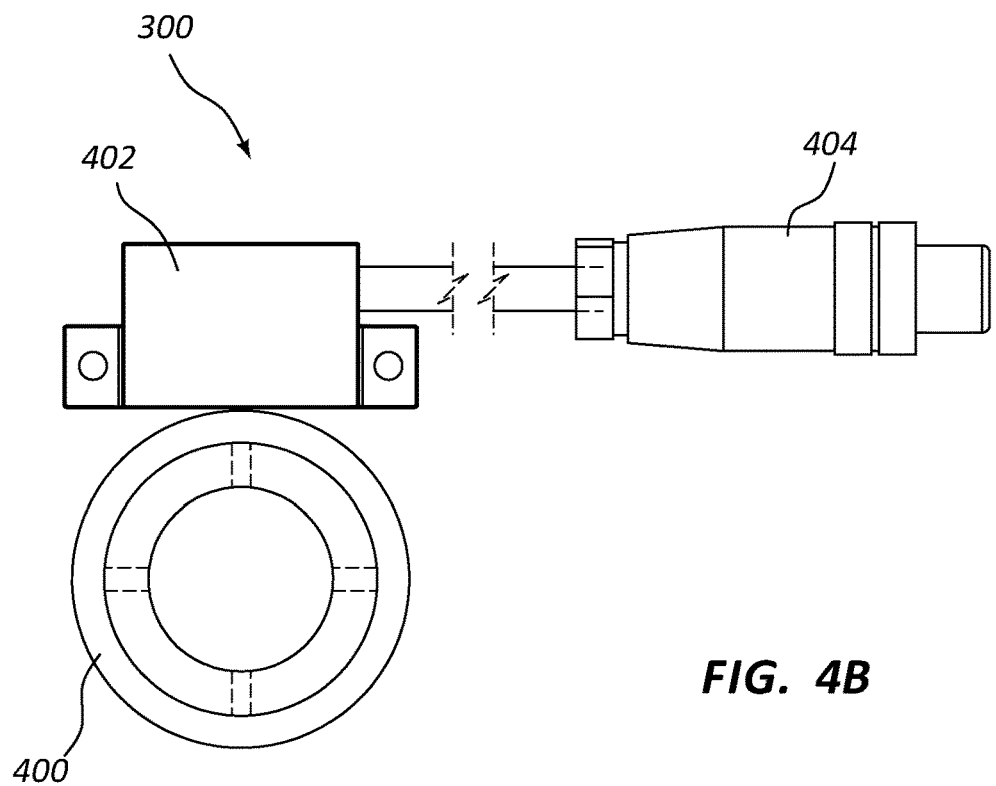
FIG. 4B is a side view of the incremental encoder of FIG. 4A.

The incremental encoder 300 is shown in greater detail in FIGS. 4A and 4B. FIG. 4A is a perspective view, and FIG. 4B is a side view. The incremental encoder 300 may comprise an encoder disc 400 and an encoder sensor 402. The encoder disc 400 is secured to the encoder shaft 302 (see, e.g., FIG. 3A) and rotates with the encoder shaft 302. The encoder sensor 402 senses the rotation of the encoder disc 400 and outputs a signal of the readings to an output connector 404 that is linked to the electronic components of the lifting cart 100. As shown in FIGS. 3A-3C, the encoder disc 400 and encoder sensor 402 are suspended with the encoder shaft 302 and their vertical motion is synchronized.

This may allow the incremental encoder 300 to accurately track the rotation of the encoder shaft 302 as the encoder wheel 112 moves while in contact with the railway. In some embodiments the incremental encoder 300 may use a magnetic encoder sensor 402 to detect and count rotations of the encoder shaft 302.

Figure 5A:
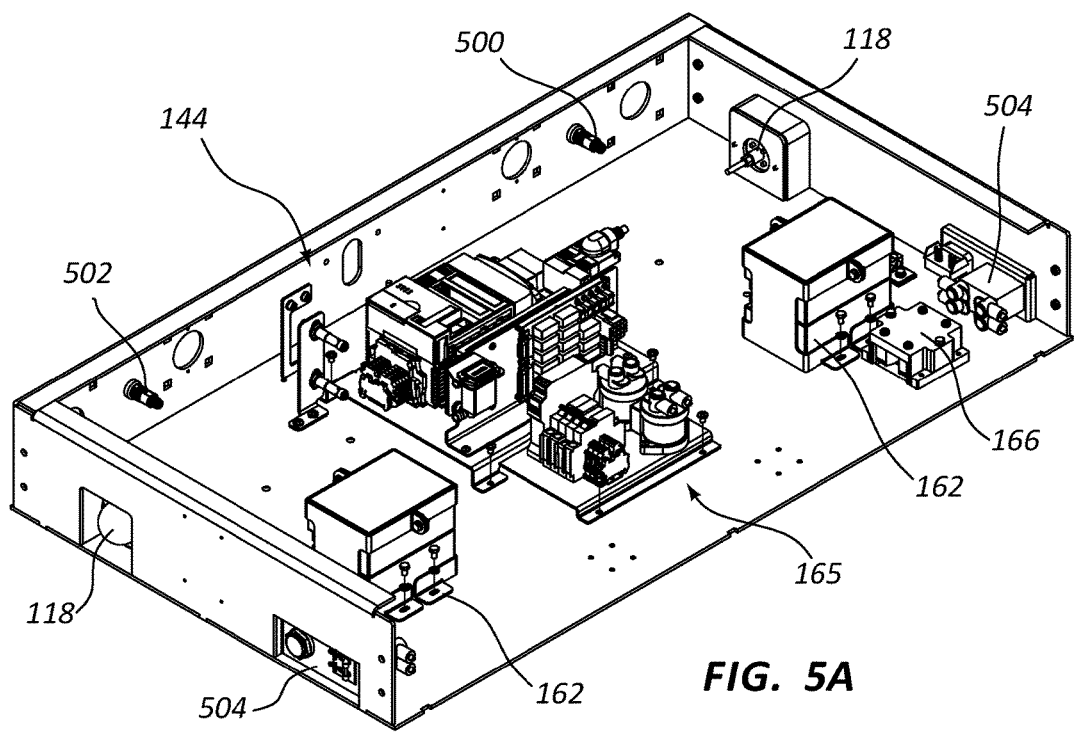
FIG. 5A is a simplified perspective view of a lifting cart in accordance with an exemplary embodiment of the present disclosure.
Figure 5B:
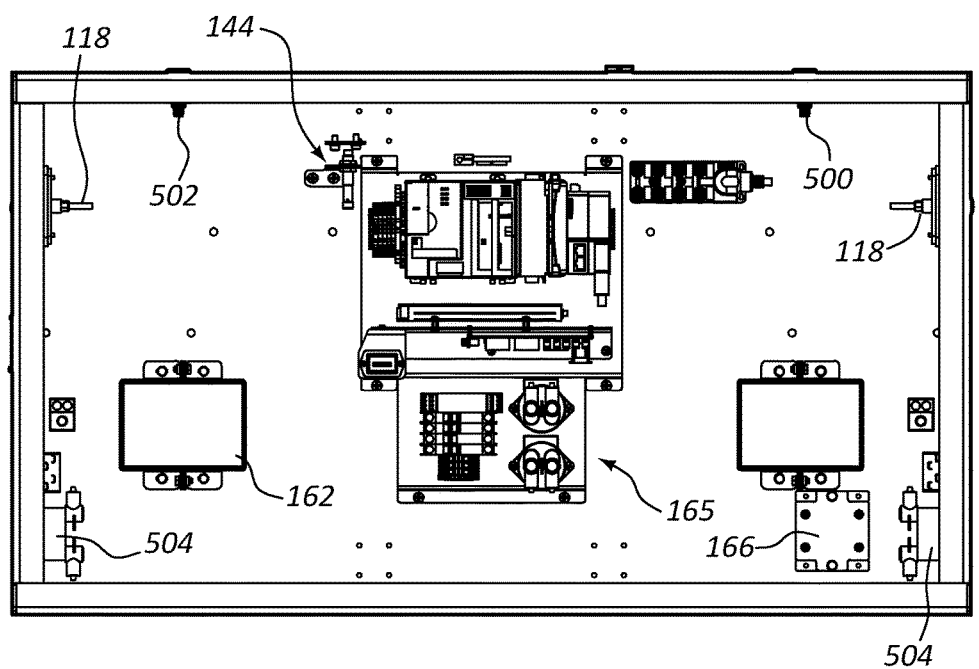
FIG. 5B is a top view of the simplified lifting cart of FIG. 5A.

FIGS. 5A and 5B show simplified views of the lifting cart 100 where electronic components are isolated in the base enclosure 104, including the battery enclosures 162 (and batteries within), the pair of proximity sensors 144, the control electronics 165, contactor assembly 166, the transceiver antennae 118, lateral photo sensors 500, 502, and circuit breakers 504. In FIG. 5A, the near sidewall of the base enclosure 104 is hidden to show the detail of components behind it. The lateral photo sensors 500, 502 may obtain images or sense light to the side of the lifting cart 100, as described in more detail below, including, for example, the descriptions made in connection with FIGS. 14, 16, and 17. The lateral photo sensors 500, 502 may also be used to detect a home position for the cart 100. For example, in embodiments where the home position of a row cart is on top of an aisle cart, the lateral photo sensors 500, 502 may sense two reflectors on the aisle cart and the home position may be established when both reflectors are aligned with the lateral photo sensors 500, 502. In other embodiments, reflectors may indicate a home position on a surface of the railway or adjacent to a load.

These views also show the opposite external orientation of the transceiver antennae 118. The circuit breakers 504 may be positioned external to the base enclosure 104 as shown to allow easier maintenance of the electrical systems of the lifting cart 100. The circuit breakers 504 also provide built-in redundancy. Having one set of circuit breakers 504 on each end of the cart 100 allows easy access no matter where the cart is positioned and no matter whether maintenance is performed from one end or the other. It may be difficult otherwise to access circuit breakers 504 on only one end of the cart 100 when a breakdown occurs and the end having circuit breakers is inaccessible under a pallet load.

Figure 6:
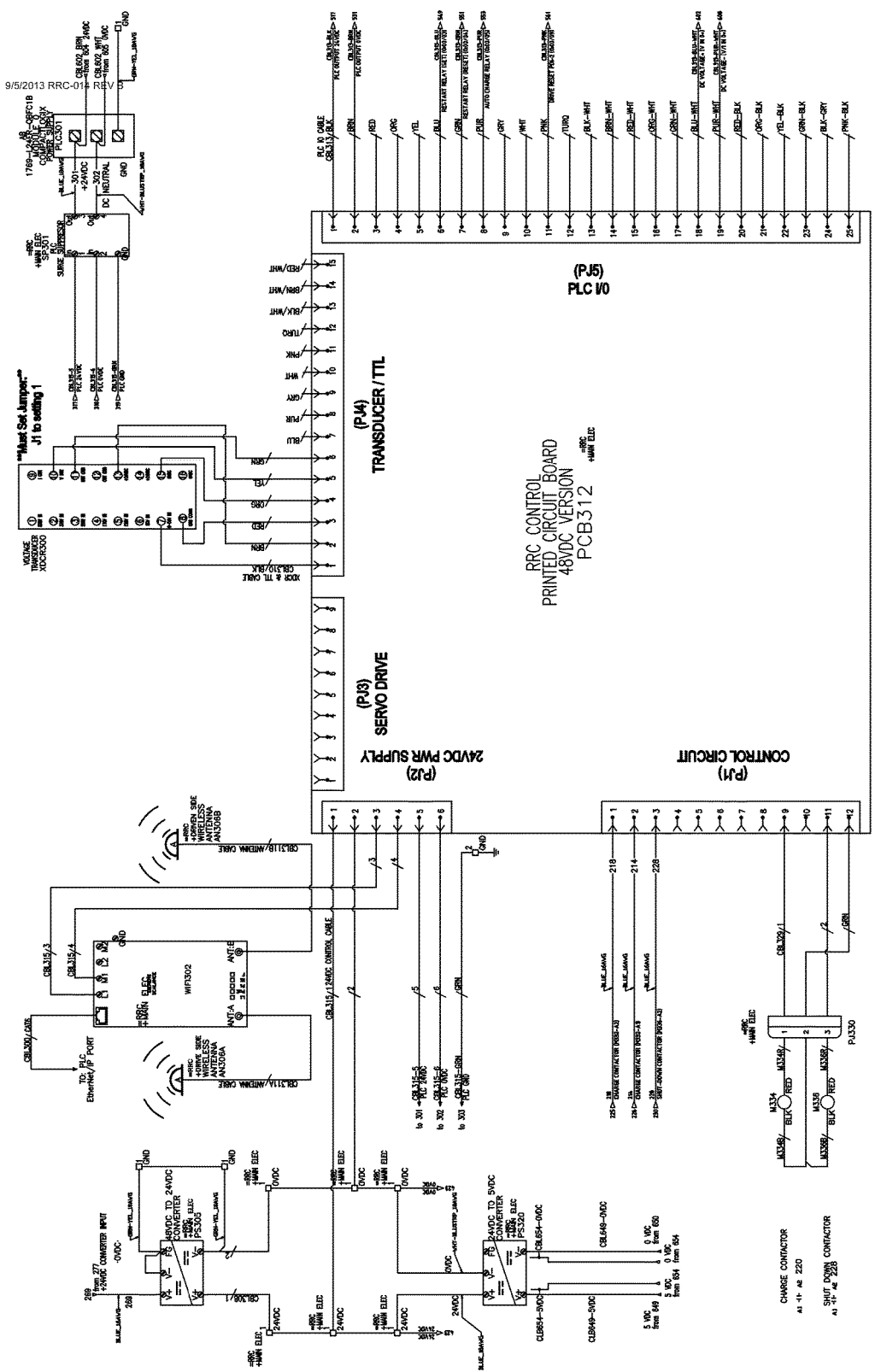
FIG. 6 is an electrical diagram for a lifting cart of an exemplary embodiment of the present disclosure.

FIG. 6 is an electrical diagram of various components of the lifting cart 100 used in implementation of the control electronics 165 shown in FIG. 1G. In the exemplary embodiment shown, control of the lifting cart 100 is provided in part by a central printed circuit board to which various components are connected.

Figure 7A:
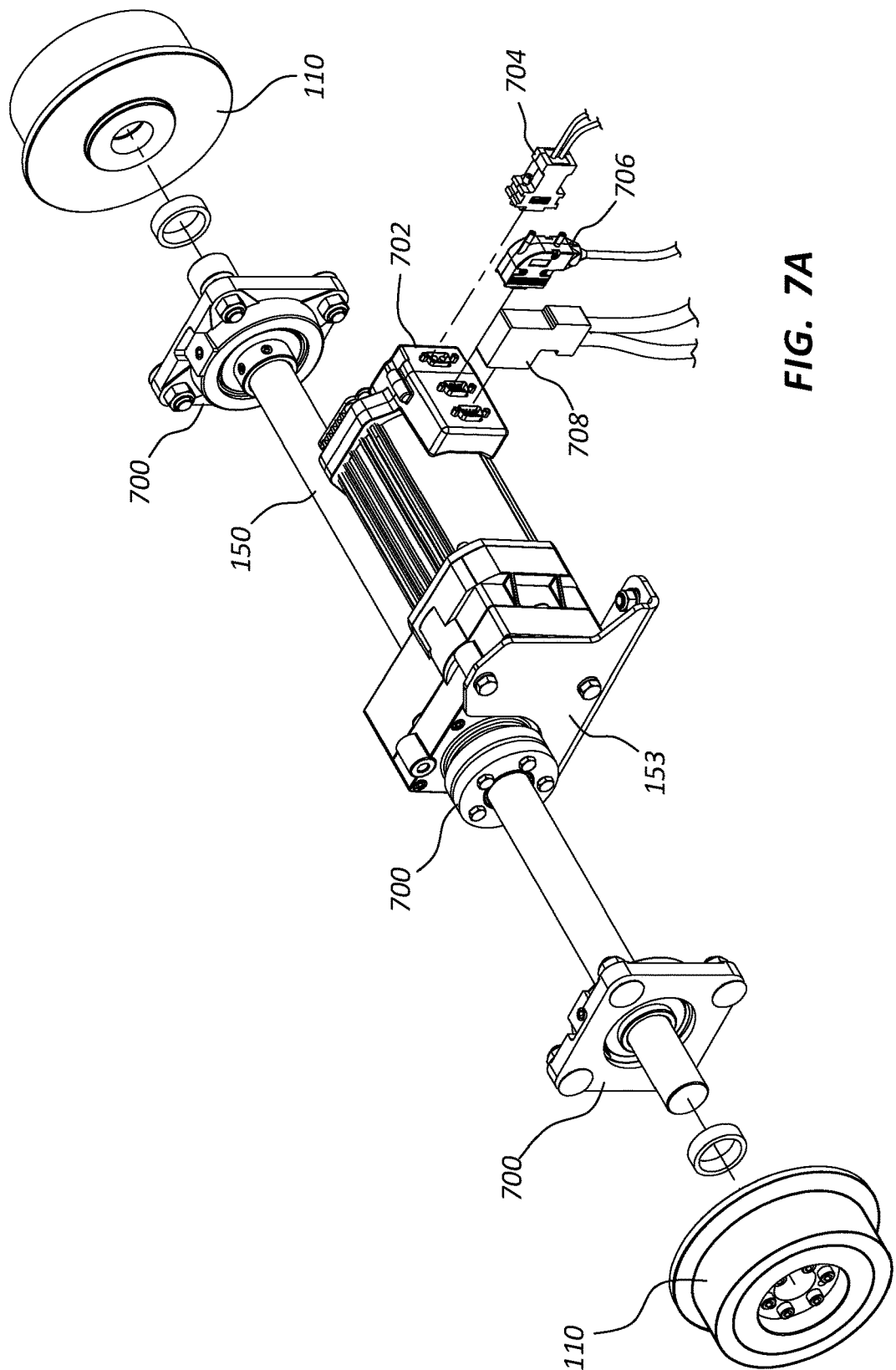
FIG. 7A is an exploded perspective view of a rear drive assembly according to an embodiment of the present disclosure.
Figure 7B:
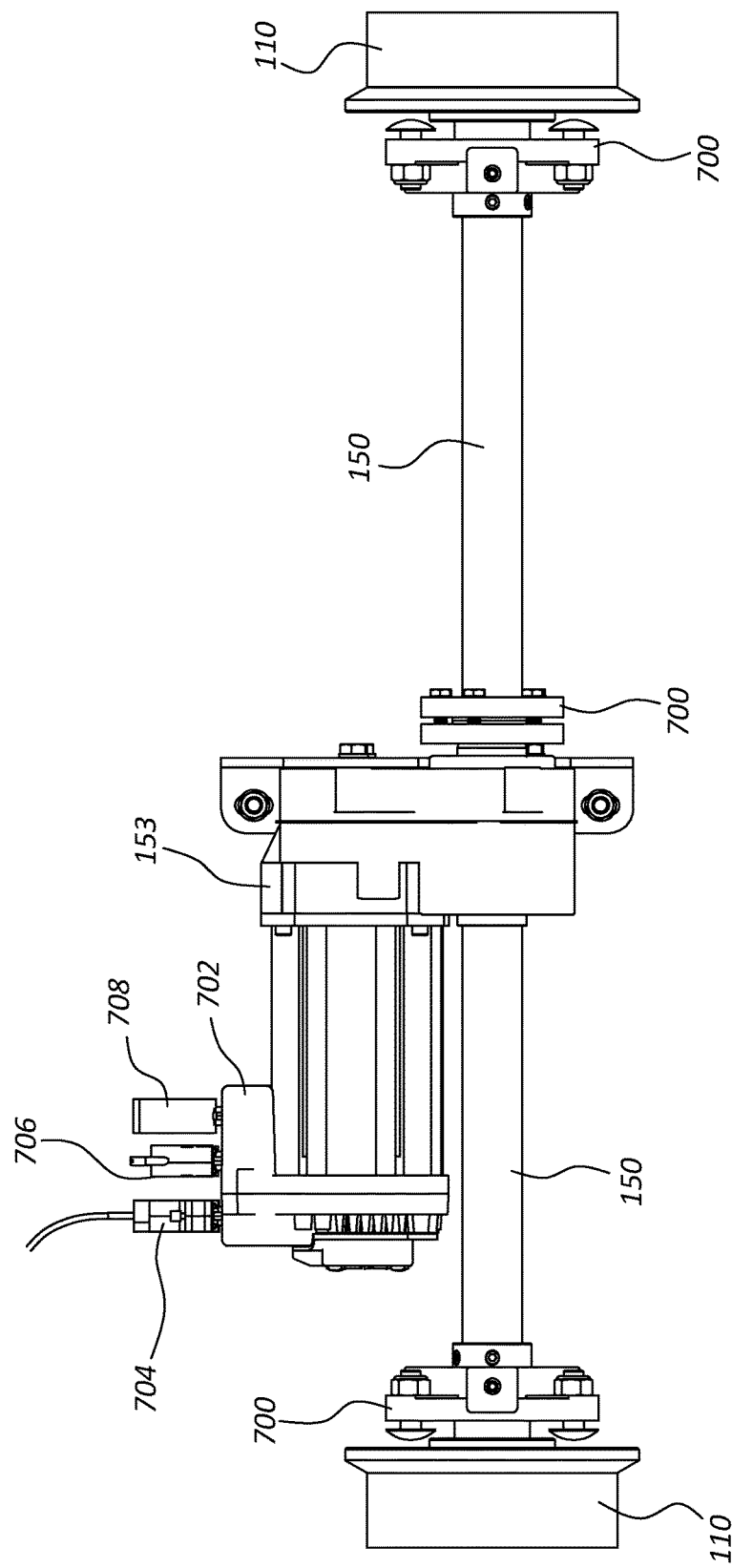
FIG. 7B is a top view of the rear drive assembly of FIG. 7A assembled together.

FIG. 7A is an exploded perspective view of a rear drive assembly that may be installed in some embodiments of a lifting cart 100 according to the present disclosure. FIG. 7B is a top view of assembled components of FIG. 7A. The rear drive motor 153 may be connected to the drive wheels 110 by the rear drive shaft 150. The drive shaft 150 may be secured within bearings 700. The rear drive motor 153 may have a power and control interface 702 to which multiple connections may be attached. For example, the power and control interface may receive a motor power line 704, a motor signal line 706, and a controller area network (CAN) connection 708. The rear drive motor 153 may therefore receive power and send and receive signals to other elements of the lifting cart 100 and surrounding systems. For example, these connections may be used to control the speed of the motor 153. In some embodiments, the rear drive motor 153 may have an integrated encoder, and the output of the encoder may be output via the power and control interface 702. In other embodiments an external encoder may be configured to obtain a property of rotation of the drive motor 153, drive shaft 150, or drive wheels 110 through a connection outside the power and control interface 702 of the drive motor 153. While reference in FIGS. 7A and 7B has been made to the rear drive motor 153 and related components, like features and elements may be found in the front drive motor 152 and its related components, as will be understood by those having skill in the art.

Figure 8:
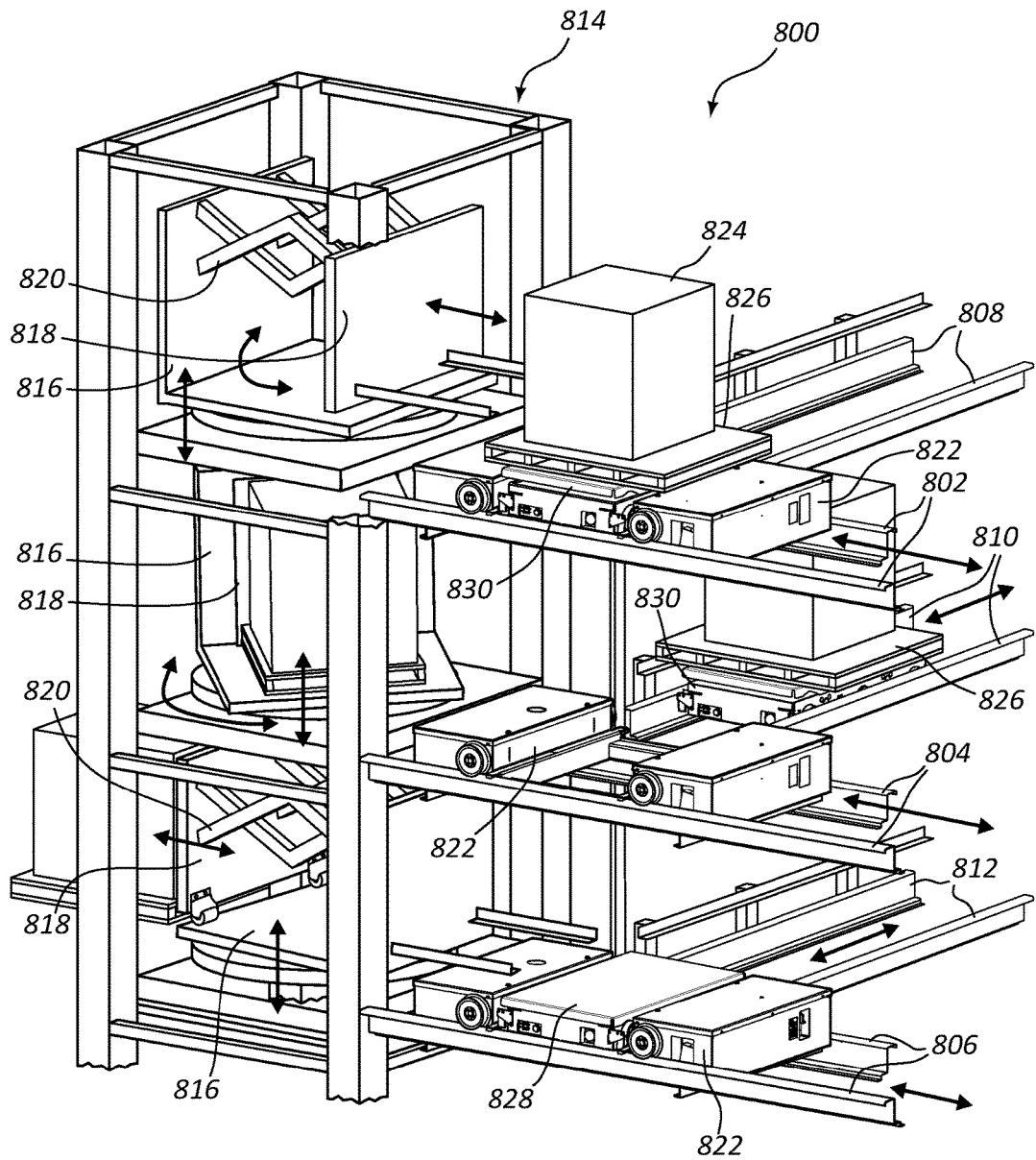
FIG. 8 is an illustration of an automated storage and retrieval system (AS/RS) according to an example implementation of various elements of the present disclosure.

FIG. 8 is an illustration of an automated storage and retrieval system (AS/RS) 800 according to an example implementation of various elements of the present disclosure. An AS/RS system 800 may include a network of multi-level aisle railways 802, 804, 806 connected to multi-level row railways 808, 810, 812. The row railways 808, 810, 812 may be substantially perpendicular to the aisle railways 802, 804, 806. The levels may be linked to each other using an elevator 814 which may have a rotating freight platform 816. The rotating freight platform 816 may be loaded by a forklift or forklift-like apparatus (FLA) 818. In FIG. 8, the rotating freight platform 816 is shown in multiple positions illustrating an exemplary path of motion from bottom to top of the railway structure. The rotating freight platform may be unloaded through use of a scissor-jack 820. Aisle carts 822 may be positioned to retrieve a load 824 on a pallet 826 moved by the elevator 814. In some embodiments, an aisle cart 822 may be moved to a position from which a row cart 828 moves to retrieve the load and then return to the aisle cart 822 instead of the aisle cart 822 moving completely under the pallet 826 along with the row cart 828. The aisle carts 822 may move along the aisle railways 802, 804, 806 while carrying a row cart (e.g., an unloaded row cart 828 or loaded row cart 830). An unloaded row cart 828 may be positioned underneath a pallet 826 and then raise its lid (e.g., lid 102) to engage and lift the pallet 826, such as is shown by each loaded row cart 830. The aisle cart 822 may then move the loaded row cart 830 to a railway (e.g., railways 808, 810). The loaded row cart 830 may then separately move along the railway 808 to deposit the pallet 826 at a designated location. The row cart may then return unloaded to a home position on the aisle cart 822 for recharging or for service in moving and storing another pallet.

Figure 9:
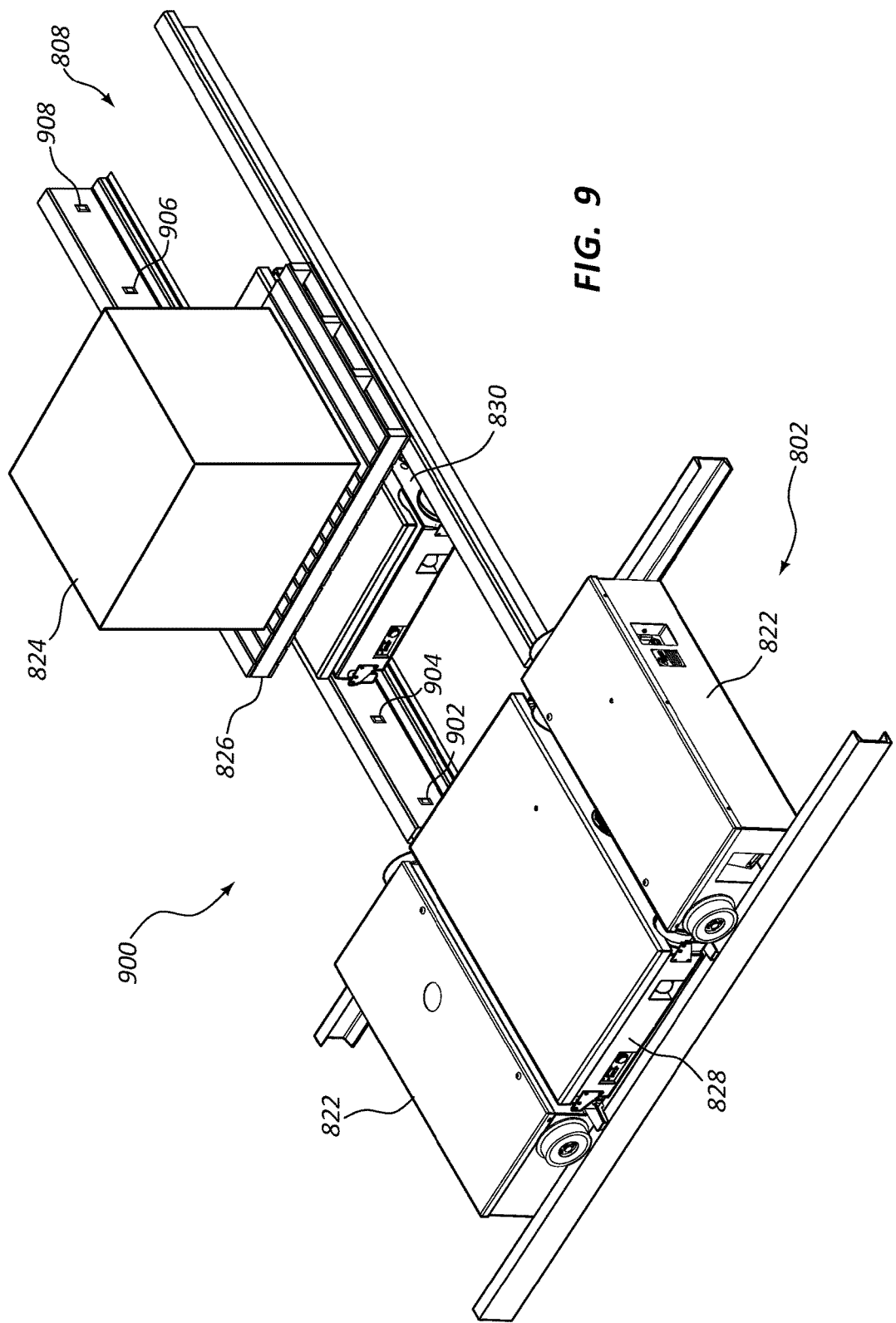
FIG. 9 is an illustration of an individual row of one level of an AS/RS system according to an exemplary embodiment of the present disclosure.

FIG. 9 shows an individual row 900 of one level of an AS/RS system (e.g., AS/RS system 800). An aisle cart 822 may bring a row cart 828 down an aisle railway 802 to a destination row railway 808. A loaded row cart 830 may move a pallet 826 and load 824 along the row railway 808 to a destination location, at which point the loaded row cart 830 lowers its lid (e.g., lowering lid 102 by rotation of the cams 130, 132, 134, 136), leaving the pallet 826 to rest with the load 824 on the row railway 808 and/or a support surface adjacent to the rails. The unloaded row cart may then move away from the load 824 in the railway 808 and back onto the aisle cart 822.

In some embodiments, reflectors 902, 904, 906, 908 may be implemented to improve accuracy of positioning of a lifting cart (e.g., lifting cart 100) in the row railway 808. As a row cart 830 moves along the row railway 808, photo sensors (e.g., lateral photo sensors 500, 502) may be positioned to sense the reflectors 902, 904, 906, 908 and use these signals to periodically calibrate positioning of the row cart 830, thereby improving the overall accuracy of the placement of a pallet 826. See also FIGS. 14, 16, and 17 and their related description. In some embodiments, each reflector 902, 904, 906, 908 may have a corresponding counterpart reflector on the opposite rail of the row railway 808 to facilitate row carts that have sensors on multiple sides, or that are oriented with sensors facing the opposite rail. The number of reflectors shown in FIG. 9 is illustrative of one embodiment, but more or fewer reflectors may be implemented in other embodiments. In one embodiment, at least one reflector is attached at the end of the railway facing a direction parallel to the rails in such a manner that it may be used to reflect a laser or other signal propagated substantially parallel to the rails.

In additional embodiments, the reflectors 902, 904, 906, 908 may be replaced with other sensing points. For example, the reflectors 902, 904, 906, 908 may be exchanged for or used in conjunction with magnets, and sensors on the row cart 830 may be configured to sense the magnetic field of each magnet as the cart 830 passes by. In another example, the reflectors 902, 904, 906, 908 may be exchanged for or used in conjunction with short members extending from the side of the row railway 808 and interacting with portions of the row cart 830. The short members may contact a gear or switch on the outer enclosure of the row cart 830 and thus provide a system by which the row cart 830 may count the number of members passed along the railway through mechanical interaction with a portion of the row railway 808.

Principles of the reflectors 902, 904, 906, 908, magnets, short members, and other like features and elements may also or alternatively be applied to aisle carts and aisle railways. The preceding description is thus intended to present exemplary embodiments and principles which may be extended and applied as appropriate to various alternative configurations, combinations, and embodiments.

Figures 10A, 10B:
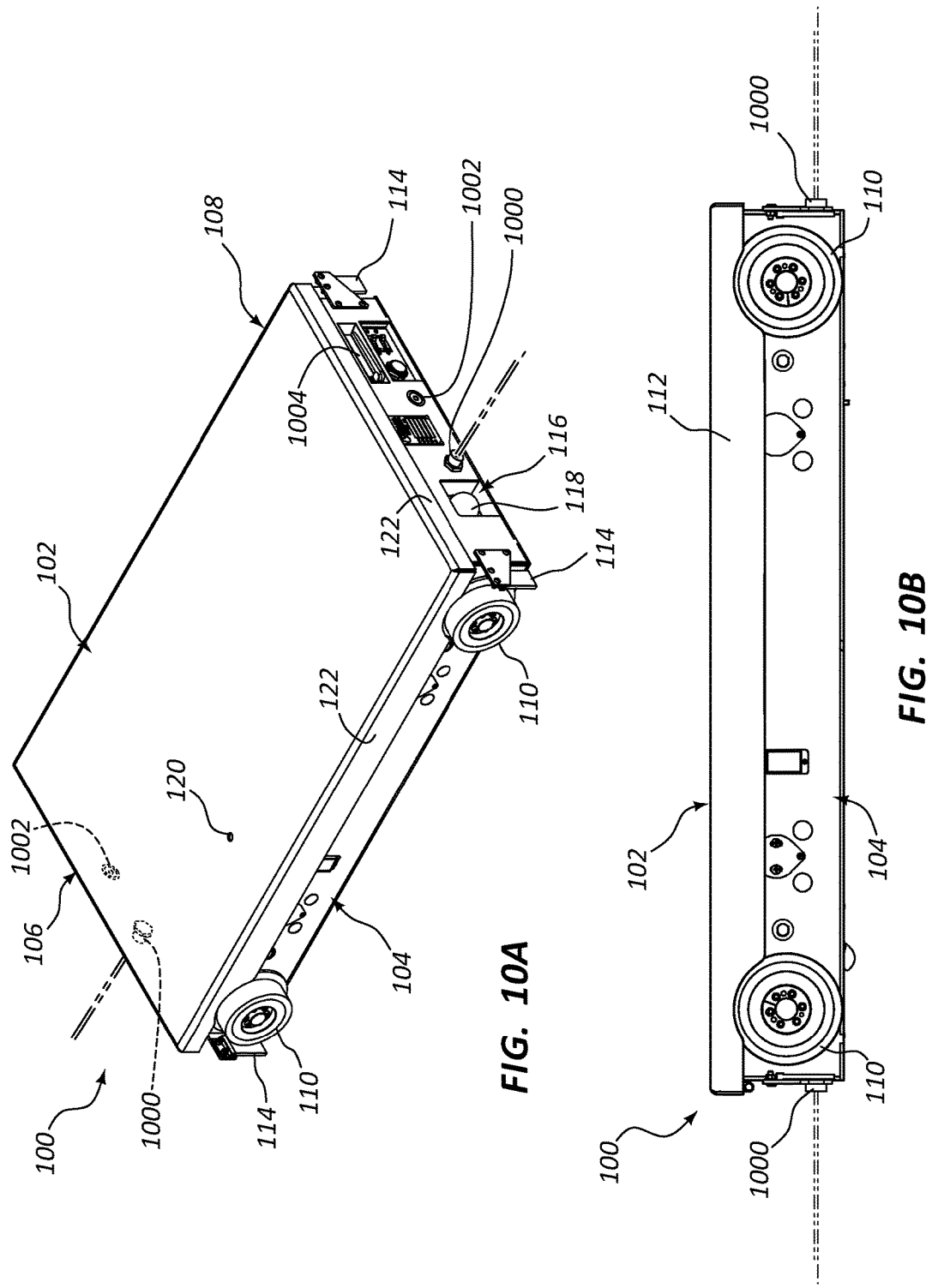
FIG. 10A is a perspective view of a lifting cart having laser emitters and laser sensors according to an embodiment of the present disclosure.
FIG. 10B is a side view of the lifting cart of FIG. 10A.

FIGS. 10A and 10B show views of a lifting cart 100 having laser emitters 1000 and laser sensors 1002. The laser emitters 1000 and sensors 1002 may be used as a laser rangefinder for determining the position of the lifting cart 100 as it moves through a railway. FIGS. 11A and 11B show views of a lifting cart 100 having ultrasonic emitters 1100 and ultrasonic sensors 1102. These additional components may be used to locate the position of the lifting cart 100 through a process of acoustic location. These methods and processes are discussed in further detail in connection with FIGS. 15 and 17 below. In some embodiments the emitters 1000, 1100 and sensors 1002, 1102 may be positioned elsewhere on the cart 100, including, for example, on the left and right of the cart 100 or a combination of left/right and front/back of the cart 100 to sense the position of the cart in two dimensions.

Figure 12A:
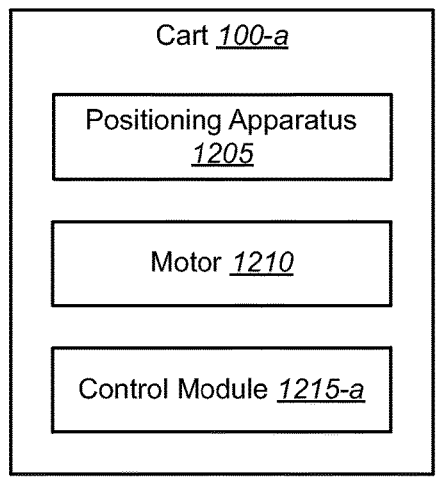
FIG. 12A is a block diagram of an exemplary embodiment of a cart for use in a railway system according to an exemplary embodiment of the present disclosure.

FIG. 12A is a block diagram of an exemplary embodiment of a cart 100-a in a railway system. The cart 100-a may be the lifting cart 100 of FIG. 1A. The cart 100-a may include a positioning apparatus 1205, a motor 1210, and a control module 1215-a. The motor 1210 may control the movement of the cart 100-a throughout the railway via wheels, drive shafts, and other necessary related parts. The positioning apparatus 1205 may include an encoder (e.g., internal encoder 164), an encoder wheel (e.g., encoder wheel 112), a sensor (e.g., photo sensors 140, 500, or 502 or signal sensors 1002, 1102), an emitter (e.g., emitters 1000, 1100), and other apparatus related to and configured to determine the position of the cart 100-a in the railway. The control module 1215-a may comprise a controller or computing module configured to control the motor 1210 and positioning apparatus 1205. In some embodiments the control module 1215-a may include a processor and associated memory configured to store instructions for the control and operation of the motor 1210 and positioning apparatus 1205. In these embodiments, the control module 1215-a may execute an algorithm or program stored in the memory to determine or monitor the positioning of the cart 100-a via the positioning apparatus 1205 and to cause the cart 100-a to move using the motor 1210. In some arrangements, the control module 1215-a may not receive instructions from an outside source aside from the signals received from the positioning apparatus 1205 (e.g., sensors and instruments).

Figure 12B:
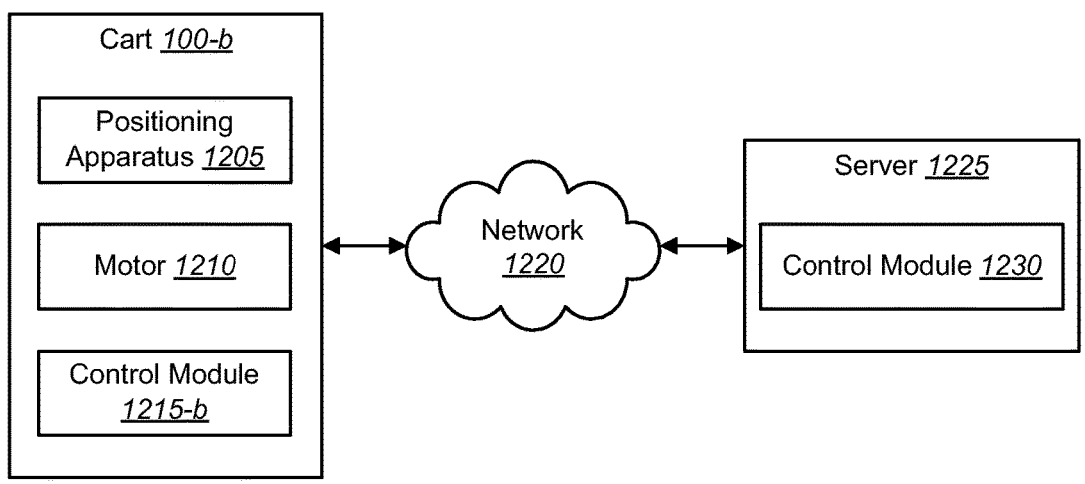
FIG. 12B is a block diagram of an exemplary embodiment of a network-connected cart and server for use in a railway system according to an exemplary embodiment of the present disclosure.

FIG. 12B is a block diagram of a system in which a cart 100-b may be located and controlled in a railway. The cart 100-b may be the lifting cart of FIG. 1A or the cart 100-a of FIG. 12A. The cart 100-b may include positioning apparatus 1205, a motor 1210, and a control module 1215-b. The positioning apparatus 1205 and motor 1210 may be the as described in FIG. 12A. In some embodiments, the control module 1215-b may be the same as control module 1215-a, thereby providing the cart 100-b with independent control, monitoring, and positioning capability. In these embodiments, the control module 1215-b may also receive commands, instructions, updates, and other directional elements via a network 1220 connection to a server 1225.

The network 1220 may include a wired or wireless network, such as, for example, a local area network (LAN) or wide area network (WAN) including, without limitation, the Internet or an intranet. Connectivity over the network 1220 may be achieved by a variety of wired and wireless connectivity devices, including, for example, wi-fi, radio frequency (RF) communications, Bluetooth®, Zigbee®, cables, tethers, wireless Ethernet, cellular network communications, Wireless LAN, other formats known in the art, and combinations thereof.

In other embodiments, the control module 1215-b may simply receive and execute commands and instructions directly from the server 1225 without capability for independent calculation and control. Some of these arrangements may be referred to as a master-slave configuration where control module 1230 is the master and control module 1215-b is the slave. The server 1225 may be a remote controller, computing module, or computer configured to monitor the cart 100-b and locate and position the cart 100-b, via its control module 1230, through remote control and communication of the positioning apparatus 1205, motor 1210, and/or control module 1215-b. Control module 1230 may be similar to control module 1215-a or 1215-b and may additionally be configured to receive information from multiple carts, monitor their positions and other status information (e.g., whether they are loaded or unloaded), and issue commands and instructions as needed according to input from a user or a preprogrammed or preconfigured routine. In some embodiments the server 1225 may be connected through the network 1220 to a plurality of carts (e.g., cart 100-b) in various railways (or in the same railway) to monitor the positioning and location of the plurality of carts. In some embodiments this may be beneficial in avoiding collisions between the carts, the loads they may carry, and the railway structures themselves.

In configurations where a cart 100-b connects to a server 1225, the cart 100-b (or control module 1215-b) may further comprise wired or wireless connectivity apparatus configured to make connection with the server 1225 over shared network protocols.

In some embodiments, a control module (e.g., control module 1215-a, 1215-b, 1230) may include a communications module, a conversion module, and a positioning module. In some embodiments, the control module may also include a lift control module configured to control the motion of the lid (e.g., lid 102) or other load-bearing surface of a lifting cart.

Figure 13:
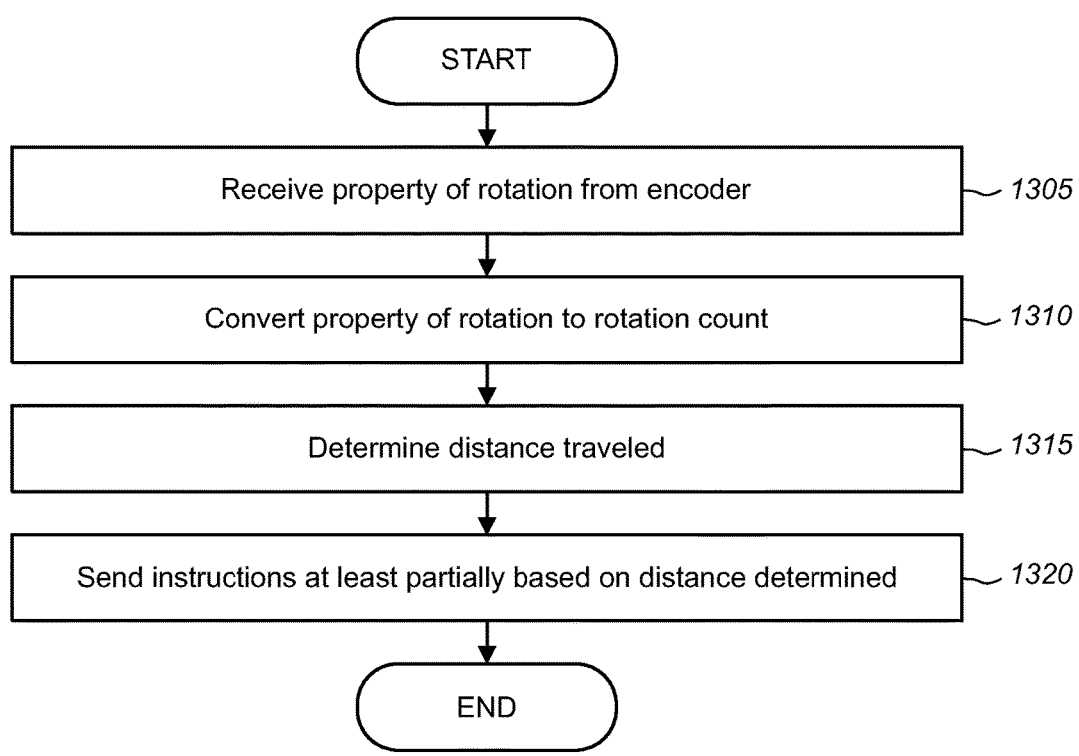
FIG. 13 is a flow diagram of an exemplary process by which a control module or controller may monitor and position a lifting cart in a railway system according to an exemplary embodiment of the present disclosure.

FIG. 13 is a flow diagram of an exemplary process that may be used by a control module or controller in monitoring and positioning a lifting cart in a railway system. In block 1305, the control module may receive a property of rotation from an encoder. In some arrangements the encoder may be internal encoder 164 connected to an encoder wheel 112 or an encoder integrated with or attached to a motor (e.g., drive motors 152, 153) or drive shaft (e.g., drive shafts 148, 150). The property of rotation may be an angular distance, a rotation count, a rotation indicator (e.g., a signal indicating each time the encoder detects a rotation), an angular velocity, an angular acceleration, or another related property.

In block 1310, the control module may convert the property of rotation to a rotation count. In some embodiments the control module may receive a rotation count in block 1305, so block 1310 may be skipped. In other embodiments the rotation count in block 1305 may be converted from a rotation count of one element to a rotation count of another element. For example, the rotation count of block 1305 may be the rotation count of a motor output which may need to be converted to obtain the rotation count of a wheel or other element of the cart due to a gearing system or drive train connecting the wheel to the motor output. Thus, the rotation count of block 1310 may not be identical to the rotation count of the property of rotation of block 1305. In some configurations, partial rotation counts may be tracked.

Conversion of the property of rotation to a rotation count in block 1310 may include determining the number of rotations made by an element of the cart based on an angular distance, velocity, and/or acceleration measured by the encoder over a period of time. The number of rotations determined may beneficially be the number of rotations experienced by an element of the cart that is synchronized in rotation with a drive wheel, encoder wheel, or other element in contact with the railway.

In block 1315, the rotation count is used to determine the distance traveled by the cart. In some embodiments the rotation count is compared to a quantity dependent upon the diameter of a wheel in contact with the railway. For example, the rotation count may be multiplied by the circumference of the wheel to provide the distance traveled by the cart. In some embodiments, the wheels may deform, such as when under the weight of a load, and the diameter of the wheels may change. In some arrangements, provisions may be made to measure and/or correct error introduced by the deformation. In other arrangements, such as when the cart uses a fifth wheel encoder, as described above, the encoder wheel may have a consistent diameter and error may be greatly reduced.

By determining the distance traveled by a cart, the control module may monitor and store the distance information for the cart (and, in some cases, other carts) to accurately track its movements through the railway. Thus, instructions to the cart may be at least partially based on the distance determined in block 1320. For example, the distance determined may be used to infer that a row cart is located 10 meters down a particular railway, and the instructions to the cart may therefore include direction to move 10 meters back down the railway to return to an aisle cart. In another example, the information about a row cart being 10 meters down a particular railway may be used when sending instructions to another cart, such as instructions to an aisle cart to move into position to retrieve the row cart or instructions to another row cart to store a load in a different railway since a row cart is already positioned in that particular railway. Additional instructions may be devised based on the individual needs of the railway system in which the process is implemented.

It is noted that in FIG. 13 and other process or method embodiments disclosed herein, blocks may be performed in a different order than illustrated and, in some embodiments, some blocks may be omitted in a manner that will be apparent to those having skill in the art.

Figure 14:
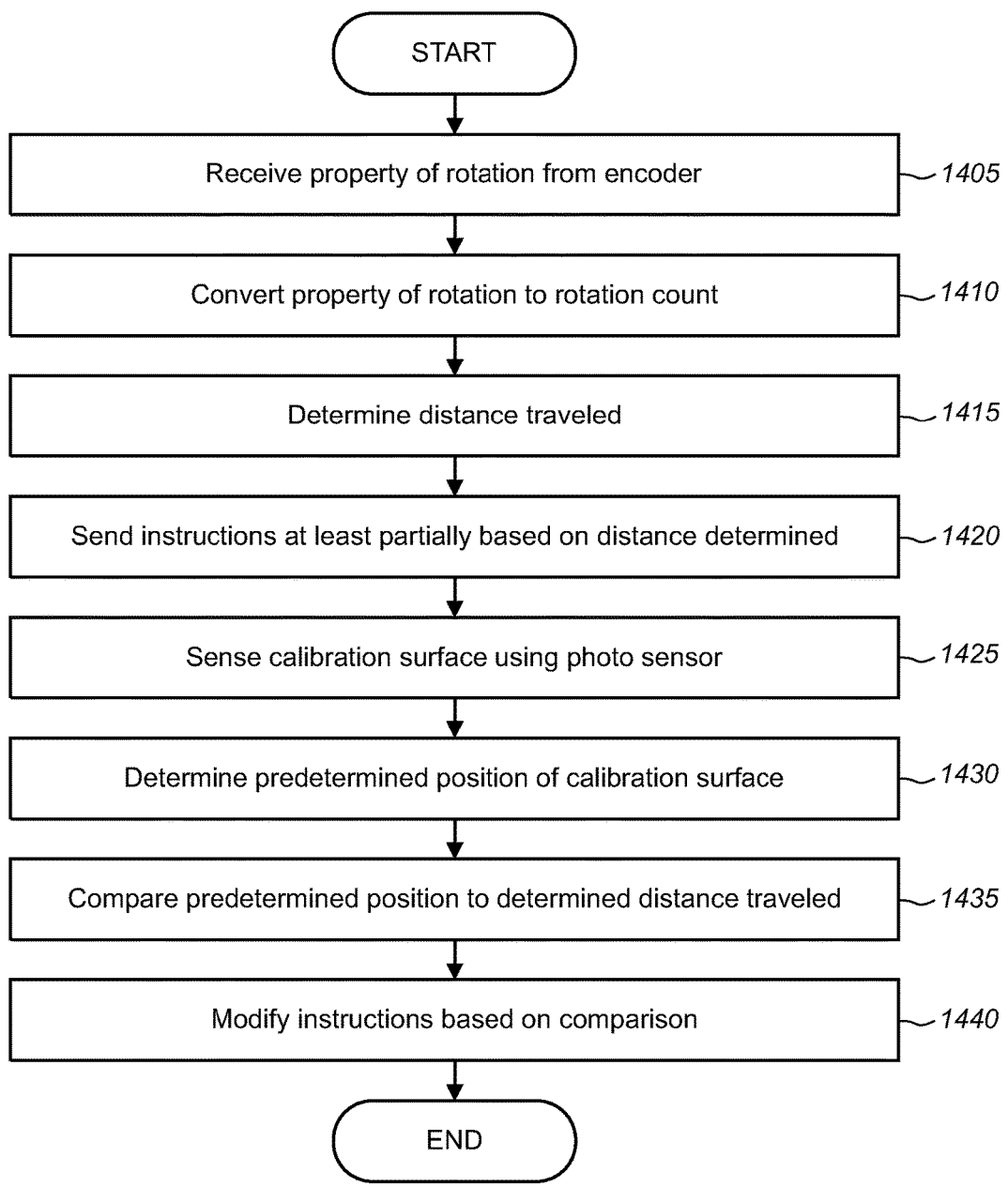
FIG. 14 is a flow diagram of another exemplary process by which a control module or controller may monitor and position a lifting cart in a railway system according to another exemplary embodiment of the present disclosure.

FIG. 14 is a flow diagram of another exemplary process by which a control module or controller may monitor and position a lifting cart in a railway system. In block 1405, a property of rotation may be received from an encoder. In block 1410, the control module may convert the property of rotation to a rotation count, and in block 1415, the distance traveled may be determined using the rotation count and/or property of rotation. The control module may send instructions based at least partially on the distance determined in block 1420. In some embodiments these blocks may include the same features (and alternative features) described in connection with corresponding blocks 1305, 1310, 1315, and 1320 of FIG. 13. The control module may perform blocks 1405 through 1420 continuously as the cart moves throughout the railway.

Potential wheel deformation and slippage may result in a determined distance traveled (e.g., from block 1415) that is inaccurate. In one embodiment errors may be detected and instructions correspondingly may be modified based on the use of a photo sensor (e.g., lateral photo sensors 500, 502 or other photo sensors positioned on the cart), as described in blocks 1425 through 1440.

In block 1425, a calibration surface is sensed using a photo sensor on the cart. The calibration surface may be any surface or element of the system that is stationary or has a known position relative to the cart. For example, the calibration surface may be a portion of the AS/RS structures, such as railways 808, 900 or a portion thereof (e.g., reflectors 902, 904, 906, 908 or other devices attached to the railways, a pattern of paint on the railways, a shape of a portion of the railways, or other similar feature). To sense the calibration surface, the photo sensor may periodically or continuously collect images in the anticipated direction of the calibration surface as the cart moves down a railway. The images captured may be output or forwarded to a computing module (e.g., control modules 1215-a, 1215-b, 1230) which is configured to analyze the images for patterns or predetermined features. In some embodiments, the computing module may also be configured to determine the orientation of the patterns or features in the images. For example, the computing module may be configured to detect the shape of a rectangular reflector in the images and detect when the photo sensor has obtained an image with the reflector centered in the view of the sensor. In some embodiments the computing module may also be configured to differentiate between different calibration surfaces, such as, for example, being able to determine whether a particular reflector is at the 1-meter mark in a railway or at a 5-meter mark in the railway due to its shape, color, or other distinguishing features viewable in the images obtained.

In some configurations, the photo sensor of block 1425 may not obtain images. Here, the photo sensor may be a photodetector (e.g., a pixel sensor or complementary metal-oxide-semiconductor (CMOS) sensor), photovoltaic cell, or other similar device configured to output a signal when illuminated or receiving light. The cart may further be outfitted with a laser emitter, LED, UV or incandescent bulb, or other light-emitting source which may be directed to shine light in the anticipated direction of the calibration surface. Using this arrangement, the light emitted from the source may reflect from the calibration surface back to the photo sensor at a heightened level when the cart passes points of interest, such as retroreflectors or other reflective surfaces, and the control module may then receive a heightened signal as the cart reaches those points of interest. In such embodiments, the properties of the signal from the photo sensor may be indicative of different calibration surfaces. For instance, a retroreflector at the 1-meter mark may be more reflective, and produce a higher magnitude signal from the photo sensor, than a retroreflector at the 5-meter mark. Likewise, a reflector at the 1-meter mark may reflect a different wavelength than a reflector at the 5-meter mark, thereby producing a different signal from a photo sensor that can differentiate between different wavelengths.

In block 1430, the signal or image of the sensed calibration surface is converted into position information. For example, the image or signal indicating a calibration surface may be compared to a database of calibration surface information, and the control module may determine that a particular signal indicates that when the cart obtained that signal, the cart was located at a predetermined position in the railway. For example, the control module may determine that when the photo sensor collects an image of a square retroreflector, the cart is at the 1-meter point in the railway and when an image of a circular retroreflector is obtained, the cart is at the 5-meter point. Likewise, if the photo sensor detects a numeral engraved or painted on the railway, the control module may analyze the image and convert the image information into position information about the cart. In some embodiments, the control module may also determine the orientation of the cart (e.g., which direction it is moving or facing at the time a signal is received or image is obtained). In various embodiments, the database of calibration surface information may be a data structure stored on the cart or on a server, a module connected thereto, or input by a user.

In block 1435, the control module may compare the predetermined position (determined by virtue of sensing the calibration surface in block 1425) to the determined distance traveled (determined by virtue of receiving the property of rotation from the encoder in block 1405). In this comparison, the control module may determine whether the predetermined position and determined distance traveled are within a margin of permitted error, and if the distances differ impermissibly, instructions to the cart (e.g., instructions of block 1420) may be modified to properly position the cart as it moves along the railway in block 1440. In some embodiments, the acceptable error range may be zero.

The modification of instructions may comprise directing movement of the cart at least partially based on the difference between the position if the calibration surface and the distance traveled by the cart based on the rotation count. Directing movement of the cart may comprise sending a signal to actuate a movement of the cart, such as to move a specified distance or move a specified number of encoder counts, to change velocity or acceleration, to move until a sensor or encoder on the cart receives a predefined value, or a related action. Thus, by way of example, modifying instructions may include increasing or decreasing the specified distance or number of encoder counts to compensate for error in the present position of the cart.

An exemplary illustration of an embodiment of blocks 1435 and 1440 is provided as follows. A row cart may be instructed to move 2,000 encoder counts down a row railway to deposit a load at the 20-meter point. As discussed previously, using urethane wheels in a lifting cart may introduce error into the determination of distance traveled by the cart. Therefore, after 1,010 counts, the control module may determine that the distance traveled by the cart is 10.10 meters based on the output of the encoder. At that time, the cart may in fact be positioned at the 10.25-meter point from the aisle cart in the railway, as determined by detection of a calibration surface at the 10.25-meter point on the railway. Due to deformation of the wheels, the cart has moved more quickly than expected. Thus, in blocks 1435 and 1440, the control module compares these distances (10.10 m and 10.25 m) and, if the determined distance is outside an acceptable error range (e.g., ±0.01 m), the instructions to the cart may be modified to compensate for the faster than expected progression of the cart down the railway. For example, the control module may decrease the number of encoder counts directed to the cart to 1,971 so that the cart will arrive at the 20-meter point as expected. The cart may be calibrated multiple times as it progresses along the railway and experiences multiple calibration surfaces, such as at the 12.5-meter mark, 15-meter mark, etc., and may therefore arrive reliably and accurately at the final destination. Later, after the cart is unloaded and moves back along the railway, the unloaded wheels may return to their normal shape, causing the cart to move at its expected rate per rotation count. If the wheels take time to reform, instructions to the cart may be adjusted and calibrated as it passes calibration surfaces on its return trip.

In some embodiments, the photo sensor/calibration features of the process described in connection with FIG. 14 may be applied to embodiments where other alternative positioning elements are present, such as, for example, a cart using a fifth wheel encoder, laser rangefinder, photographic metering system, or acoustic positioning system. Doing so may further improve the accuracy of these positioning systems, even in the absence of the error introduced by reading an encoder connected to a deformable wheel.

Figure 15:
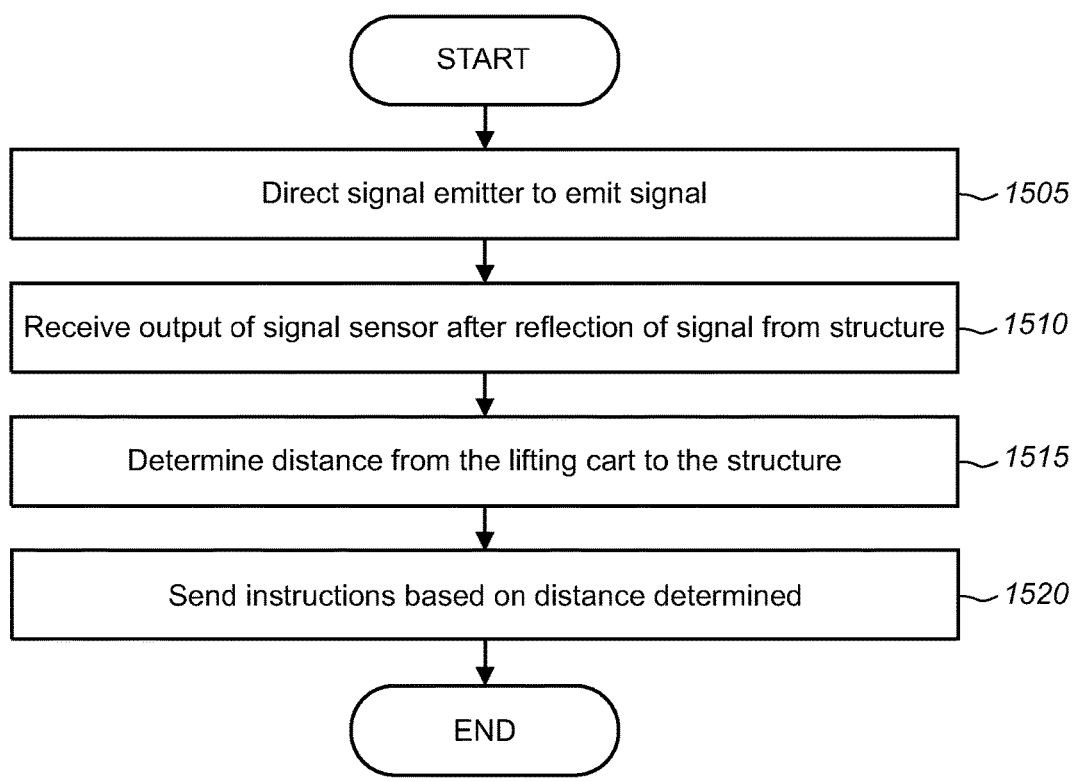
FIG. 15 is a flow diagram of another exemplary process by which a control module or controller may monitor and position a lifting cart in a railway system according to another exemplary embodiment of the present disclosure.

FIG. 15 is a flow diagram of another exemplary process by which a control module or controller may monitor and position a lifting cart in a railway system. Here, an encoder is not required, but may be used in some embodiments in addition to the means described. In block 1505, the control module may direct a signal emitter to emit a signal. A signal emitter may comprise an electromagnetic emitter (e.g., laser emitters 1000 or a radio antenna) and/or a sonic emitter (e.g., ultrasonic emitters 1100). Thus, the signal emitted may be a laser, radio wave, acoustic wave, or other signal that can be emitted by the signal emitter. In performing block 1505, the signal emitter may be directed to emit the signal in a particular direction. For example, the emitter may direct the signal in the direction of travel (or along the travel route) of the cart in the railway. If the cart is headed one direction down the railway, the emitter may direct the signal in that direction. In some embodiments the emitter is only configured to emit a signal in one direction, so control of the emitter may include instructions to emit a signal without a directional component. In such embodiments multiple signal emitters may be positioned on the cart to allow the cart to emit signals in multiple directions, such as an emitter on the front of the cart to emit when moving forward and an emitter on the rear to use during rearward motion. In other embodiments the emitter may be configured to selectively emit a signal in more than one direction, in which cases the control of the emitter may include a directional component. In some embodiments, control of emission of the signal may also include an amplitude component. For example, the amplitude of the signal may be dependent on the range to a structure or reflector in the railway to save energy for the cart when the cart is near the structure or reflector.

The emitted signal may be reflected such that it is then sensed by a signal sensor on the cart. The signal sensor may comprise an electromagnetic sensor (e.g., laser sensors 1002, radio antenna, and the like), and/or a sonic emitter (e.g., ultrasonic sensors 1102). Thus, the same signal emitted from the cart in block 1505 may be sensed in block 1510 after it has reflected. The control module may receive the output of the sensed reflected signal in block 1510. Using a rangefinding algorithm (e.g., time between emission and reception), the control module may then determine the distance from the lifting cart to the structure on which the signal was reflected in block 1515. The structure from which the signal is reflected may be a portion of the railway system such as the rails, the end of a row, an aisle cart, a load or pallet in the railway, or other feature around the cart. In one beneficial embodiment, the signal is emitted in the direction of motion of the cart, and therefore the reflection may come from the nearest obstacle in the railway. In some embodiments, the structures may be reflectors positioned around the railway which may allow the position of the cart to be determined based on reflections from particular points in the railway where the reflectors are installed. For example, the signal emitter may be a laser emitter configured with a wobbler that directs the laser across a region of the railway as the cart is in motion. The wobbler may help overcome the challenge of calibrating a fixed mount to always hit a reflector even though carts and rails may be bumpy. As the laser reflects from a reflector in the railway (e.g., a retroreflector on a pallet or at the end of the railway), the position of the cart and therefore the distance it has traveled along the railway may be determined based on the range to the reflector. The structures may face the travel route of the railway, meaning they may face generally toward the cart or an area in which the cart travels.

In block 1520, the control module may send instructions to the cart based on the position determined. For example, as the cart approaches the end of a railway or a pallet in the railway, the control module may direct the cart to slow down, or the control module may direct the cart to accelerate as it leaves a pallet behind. In another example, the cart may be instructed to stop once reaching a certain position determined in block 1515. To this end, it may be beneficial for the process of FIG. 15 to be performed frequently as the cart moves in the railway to increase the amount of polling data available in determining the present location of the cart.

In these embodiments, the use of a signal emitter may reduce or eliminate the need for an encoder. The use of a signal emitter may allow the cart to operate without regard to the weight of a load on the cart or deformation to the wheels.

In some embodiments, the cart may have one signal emitter that senses a reflection from just one structure at one end of the railway. In this case, the cart may be positioned by reference to the target structure as it moves toward the structure or moving away from the structure by polling the same point. This may be preferable in railways where the space between the cart and the structure cannot be obstructed as the cart moves about the railway.

Figure 16:
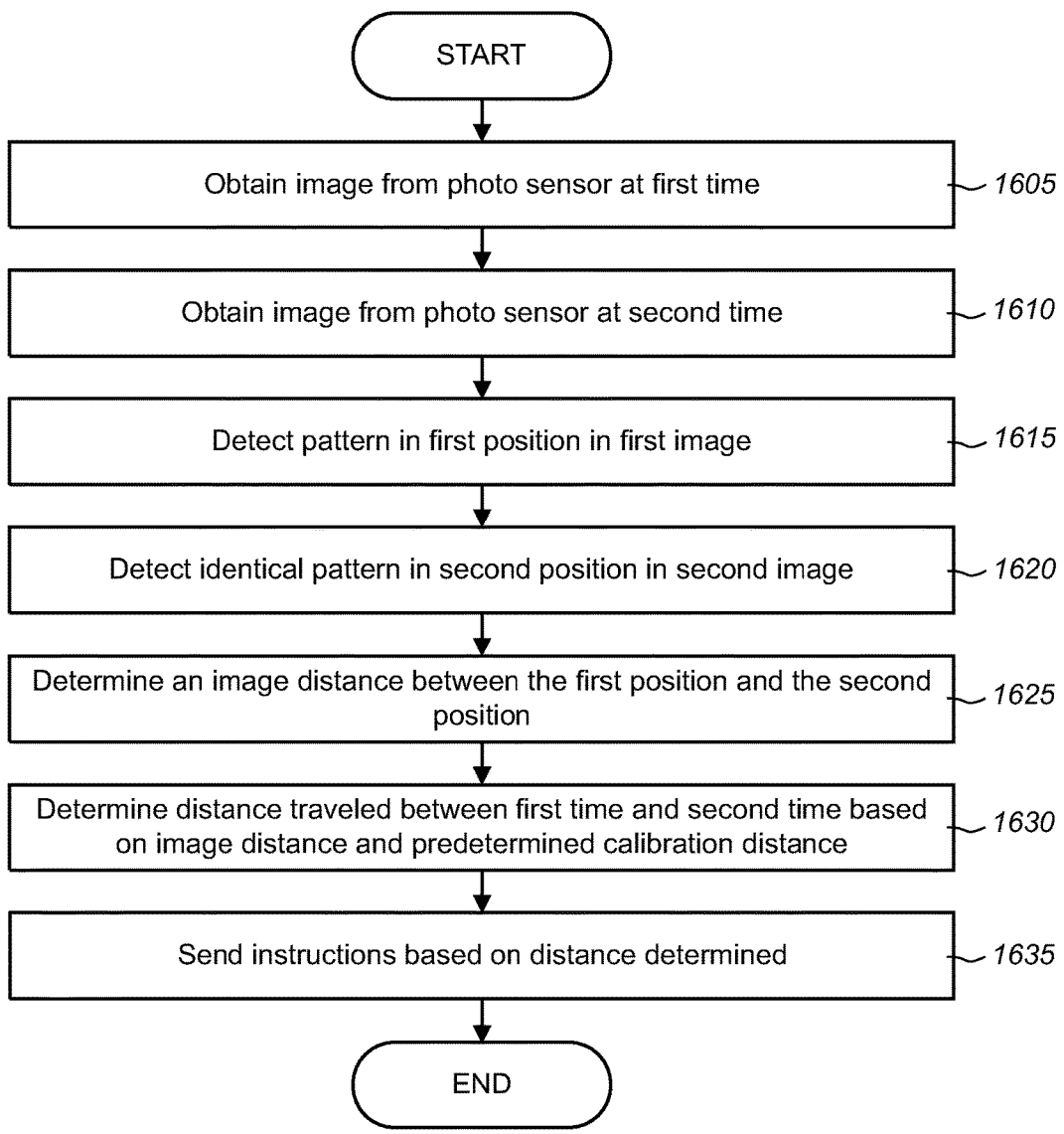
FIG. 16 is a flow diagram of another exemplary process by which a control module or controller may monitor and position a lifting cart in a railway system according to another exemplary embodiment of the present disclosure.

FIG. 16 is a flow diagram of another exemplary process by which a control module or controller may monitor and position a lifting cart in a railway system. An encoder or signal emitter is not required, but may be used in some embodiments in addition to the means described. In block 1605, the control module may obtain an image from a photo sensor at a first time. The photo sensor may be photo sensors previously discussed herein, such as, for example, photo sensor 140, at least one of lateral photo sensors 500, 502, or another photo sensor positioned on the cart. Obtaining an image may comprise collecting a photograph or other image using the photo sensor. In some embodiments, the photo sensor may be oriented to face a structure in the railway, such as, for example, a rail or patterned surface viewable by the photo sensor from the railway. The resolution of the image collected may be sufficient to determine whether a feature or object in the image collected in block 1605 is the same feature or object in the image collected in block 1610. In some arrangements, the lifting cart may further comprise a light source operable to illuminate the structure at least when the photo sensor obtains an image. For instance, an LED light source may illuminate the area in which the photo sensor collects an image of a structure so that dark areas of the railway can still be viewed. This may beneficially allow a fast "shutter speed" in what may be shadowy, low light conditions in the railway structure, so blurring in the images obtained may be reduced.

As the cart moves through the railway, the photo sensor may collect more than one image of the same pattern, depending on the rate at which the cart moves through the railway and the rate at which the photo sensor collects images. Thus, in block 1610, a second image may be collected from the photo sensor at a second time. Typically, the second time comes after the first time. In some embodiments, the second time may be about 10 milliseconds after the second time. In some embodiments, the second time may be in the range of between about 1 millisecond and 100 milliseconds after the first time. In another aspect, the time between the first and second time may be in the range of about 5 milliseconds to about 15 milliseconds. The time between obtaining images may depend on the rate at which the cart moves and the rate at which the sensor may obtain an image in order to ensure that patterns detected in the first image obtained can also be detected in the second image obtained.

Upon obtaining the two images, the control module may then in block 1615 detect a pattern in the first image having a first position. The pattern detected may be a shape or symbol in the image collected, such as a shape or form on the surface of the railway imaged by the photo sensor. In some embodiments, the pattern may be markings on the surface imaged, such as ruler markings, bumps, notches, scratches, rust, paint, and other surface features that may stand out in the image. The surface may be a side face of a rail. The position of the pattern may be its position in the image, such as, for example, the coordinates or area in the image in which it appears. In embodiments where the pattern is a dot or other shape on the structure, the first position may be the coordinates of the center of the dot in the first image. In block 1620, the control module analyzes the second image and detects the identical pattern from the first image at a second position in the second image. The location of the pattern in the second image is the second position. For example, the second position may be the coordinates of a dot in the second image.

In block 1625, the control module may determine an image distance between the first position of the pattern in the first image and the second position of the pattern in the second image. For example, the control module may detect the coordinates of a dot in the first image, determine the coordinates of the same dot in the second image, and then produce the distance between the dots in the images based on the number of pixels separating the two coordinates. Thus, the image distance may refer to the distance between two points in an image such as the pixel distance or measured distance across an image.

Using the image distance, the control module may, in block 1630, determine the distance traveled by the cart between the first position and the second position with a predetermined calibration distance. In some embodiments, the calibration distance may be a distance based on the field of view (FOV) of the photo sensor, where the distance across at least a portion of the image may be a predetermined value. For example, the distance from one side of the image to the other may be known based on the FOV of the sensor and the known distance between the sensor and the railway it is sensing. Thus, the image distance may be compared to a known calibration distance and the distance that the cart has traveled between the first time and the second time may be calculated. Over time, the total distance traveled by the cart may be aggregated.

In another embodiment, the predetermined calibration distance may be a marking in one or more of the images obtained by the photo sensor. For example, the calibration distance may be a marking in the image that is known to be five centimeters wide. Here, the image distance may be directly compared to the distance known in the image to obtain the distance traveled between the first position and the second position of the pattern, and thus obtain the distance traveled by the cart between those positions.

In block 1635, the control module may send instructions based on the distance determined in block 1630. For example, the instructions may be instructions to change the velocity of the cart based on the position of the cart, to follow given instructions for a certain additional distance, or adjust the duration of time that the cart is instructed to travel at a given rate to compensate for weight of a load slowing the cart as it moves. In some embodiments, as the cart approaches the end of a railway or a pallet in the railway, the control module may direct the cart to slow down, or accelerate as the cart leaves a pallet behind. The cart may also be directed to stop upon reaching a certain position determined in block 1630.

In some embodiments, blocks 1605 through 1630 are repeated, and the position of the cart may be constantly updated and tracked as it moves through the railway along its travel route. In other embodiments, the process may be repeated periodically, such as at pivotal points when the instructions to the cart are set to change or when the cart is programmed to retrieve additional instructions from a control module or server.

Figure 17:
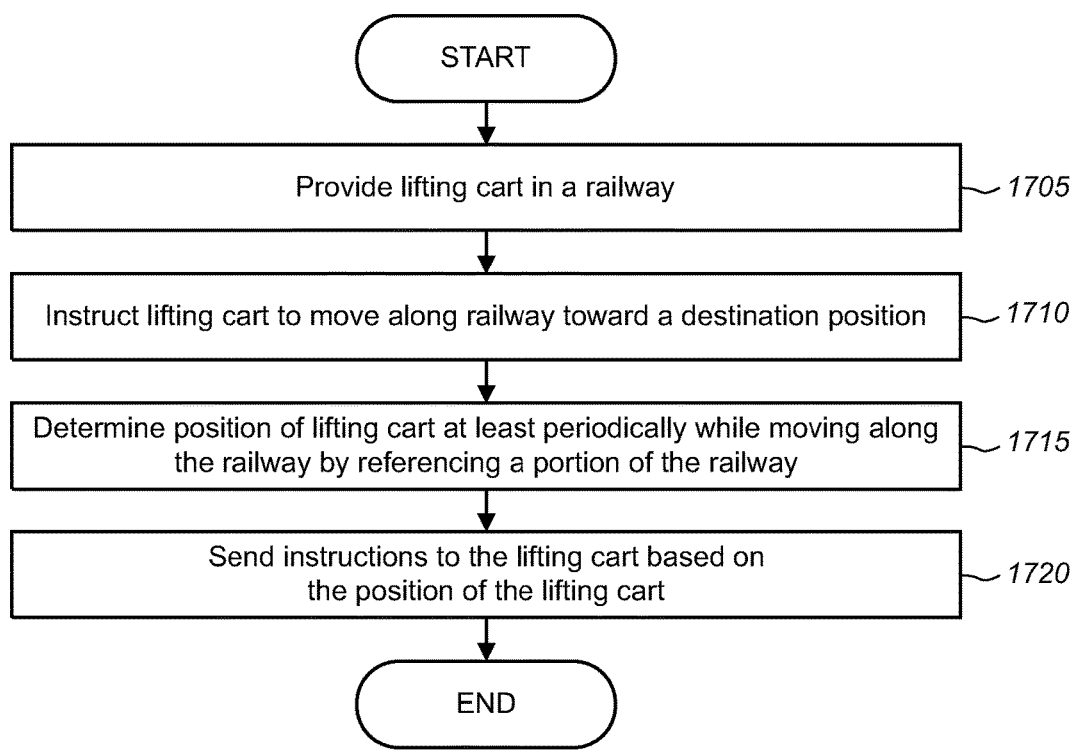
FIG. 17 is a flow diagram of an exemplary method of controlling a lifting cart in an automated storage facility according to another exemplary embodiment of the present disclosure.

FIG. 17 is a flow diagram of an exemplary method of controlling a lifting cart in an automated storage facility. In block 1705, a lifting cart is provided in a railway. For example, the lifting cart may be a cart described previously herein (e.g., lifting cart 100), and the railway may be a railway of an AS/RS system (e.g., row railway 808, aisle railway 802, and the like). The lifting cart may be located in the railway and enabled to move throughout the railway along rails. In block 1710, instructions may be sent to the lifting cart to move along the railway toward a destination position. The instructions may come from a control module, which may be part of the cart or part of a remote operations control center or server. A destination position may comprise a position in the railway (e.g., five meters from the end of the railway) or a position relative to another point of reference (e.g., two meters from the current position of the lifting cart). If the cart has an encoder, the destination position may comprise a specified number of encoder counts. If the cart has a photo sensor, the destination position may comprise a signal, such as, for example, the position where the photo sensor(s) detect a predefined shape or output a signal having predefined properties. In some embodiments, the destination position may be where the cart detects that a pallet or load is directly above a photo sensor of the cart or lateral photo sensors detect a predetermined shape on a structure in the railway.

In block 1715, the position of the lifting cart may be at least periodically determined while moving along the railway by referencing a portion of the railway. The position of the cart may be determined by any of the methods, processes and apparatuses described previously herein, such as the processes disclosed in FIGS. 13-17. Thus, the cart may be positioned by an encoder count, photo sensor, signal emitter, calibration scheme, and the like. The position may be determined at least periodically as the cart is moving to provide an updated indication of where the cart is currently positioned and/or to determine the velocity of the cart. In some embodiments the position of the cart may be determined and monitored continuously, and in some embodiments the position may be determined at least once. As used in this method, a portion of the railway may be defined as a portion of the rails, a portion of the structures used to support the rails or a portion of a palletized load in the railway, a portion of a palletized load in the railway itself, and/or other carts or vehicles positioned in the railway. In some embodiments the portion of the railway may be a distant surface, such as, for example, a wall or ceiling enclosing the railway system.

Referencing the portion of the railway may include determining a property of the portion referenced. In some embodiments this may include detecting a reflection of light or another signal from the portion referenced, such as in the case of using a laser rangefinder on the cart or using reflectors as calibration surfaces in conjunction with photo sensors on the cart. In other embodiments this may include obtaining an image of the portion of the railway and referencing features of the image such as shapes, textures, or patterns to determine the position of the cart at the time the photo is obtained. A control module or user may determine the property of the portion referenced.

In block 1720, instructions are sent to the lifting cart based on the position of the lifting cart. Instructions may be sent to the cart automatically by a control module or manually by a user. In some embodiments, the instructions may include a new destination position, a change in control of the cart such as a change in speed or acceleration of the cart, and/or instructions to raise or lower a lifting portion of the cart.

Figure 18:
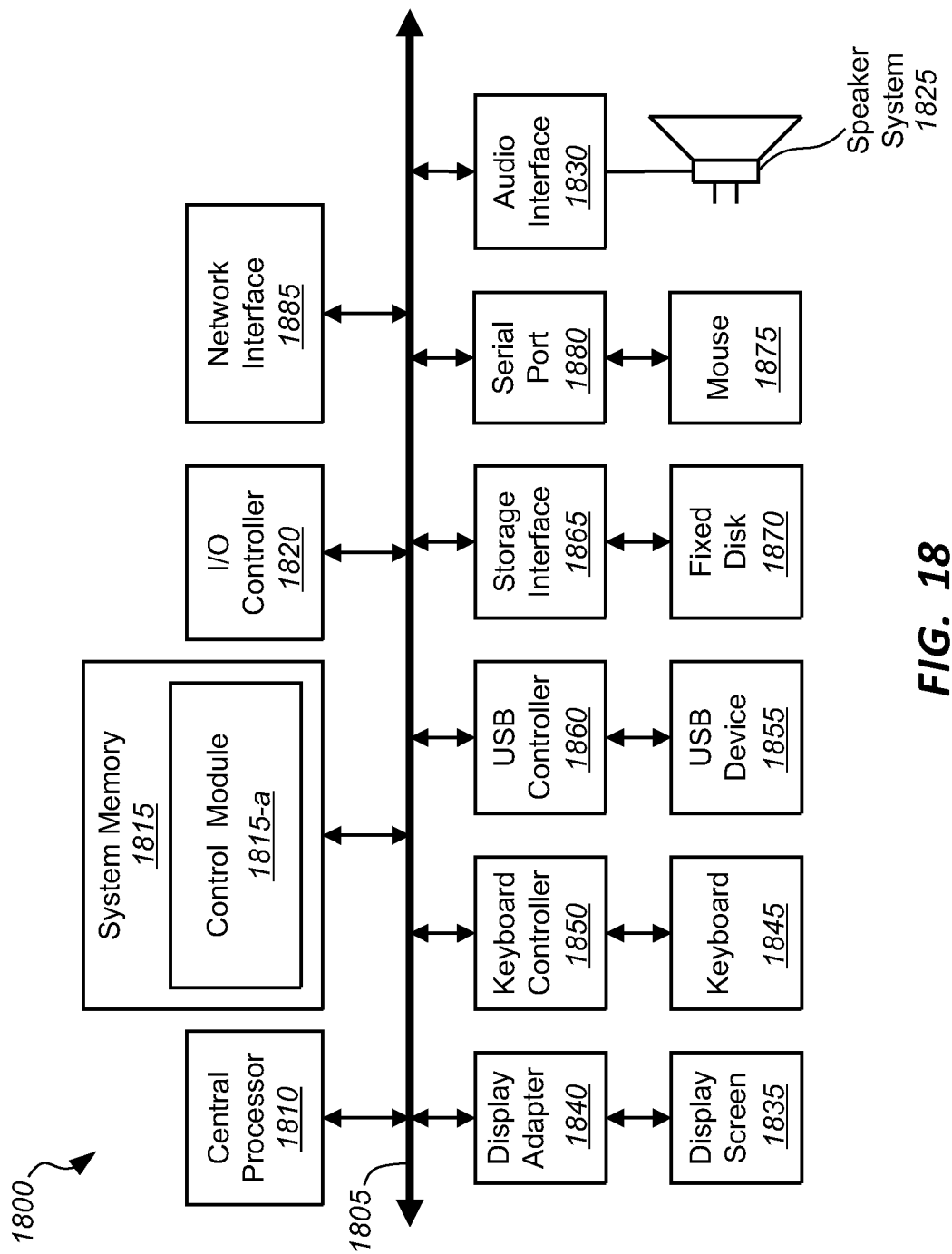
FIG. 18 is a block diagram of a computer system suitable for implementing some embodiments of the present disclosure.

FIG. 18 depicts a block diagram of a computer system 1800 suitable for implementing some embodiments of the present systems and methods. For example, the computer system 1800 may be suitable for implementing the control module 1215-*a*, 1215-*b* or server 1225 of previous figures (e.g., FIGS. 12A and 12B). In some embodiments, the computer system 1800 may comprise the control electronics 165 (see FIG. 1G) and circuit diagram of FIG. 6. Computer system 1800 includes a bus 1805 which interconnects major subsystems of computer system 1800, such as a central processor 1810, a system memory 1815 (typically RAM, but which may also include ROM, flash RAM, or the like), an input/output controller 1820, an external audio device, such as a speaker system 1825 via an audio output interface 1830, an external device, such as a display screen 1835 via a display adapter 1840, a keyboard 1845 (interfaces with a keyboard controller 1850) (or other input device), multiple universal serial bus (USB) devices 1855 (interfaces with a USB controller 1860), and a storage interface 1865. Also included are a mouse 1875 (or other point-and-click device) interfaced through a serial port 1880 and a network interface 1885 (coupled directly to bus 1805).

Bus 1805 allows data communication between central processor 1810 and system memory 1815, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, a positioning module 1815-*a* to implement the present systems and methods may be stored within the system memory 1815. The positioning module 1815-*a* may be one example of the positioning module described in connection with FIG. 12 and part of various control modules discussed herein. Applications resident with computer system 1800 are generally stored on and accessed via a non-transitory computer readable medium, such as a hard disk drive (e.g., fixed disk 1870) or other storage medium. Additionally, applications can be in the form of electronic signals modulated in accordance with the application and data communication technology when accessed via interface 1885.

Storage interface 1865, as with the other storage interfaces of computer system 1800, can connect to a standard computer readable medium for storage and/or retrieval of information, such as a fixed disk drive 1870. Fixed disk drive 1870 may be a part of computer system 1800 or may be separate and accessed through other interface systems. Network interface 1885 may provide a direct connection to a remote server (e.g., server 1225) via a direct network link to the Internet via a POP (point of presence). Network interface 1885 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., document scanners, digital cameras, and so on). Conversely, all of the devices shown in FIG. 18 need not be present to practice the present systems and methods. The devices and subsystems can be interconnected in different ways from that shown in FIG. 18. The operation of a computer system such as that shown in FIG. 18 is readily known in the art and is not discussed in detail in this application. Code to implement the present disclosure can be stored in a non-transitory computer-readable medium such as one or more of system memory 1815 or fixed disk 1870. The operating system provided on computer system 1800 may be iOS®, MS-DOS®, MS-WINDOWS®, OS/2®, UNIX®, Linux®, MAC OS X®, or another like operating system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon." Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A system for positioning a cart in an automated storage facility, the system comprising:
   a cart comprising:
      a motor,
      wheels positioned on the cart to engage a railway, at least one of the wheels driven by the motor to propel the cart in the railway, and
      an encoder reading a property of rotation of a rotating element of the cart, the rotating element rotating along with motion of the cart in the railway;
   means for calibrating the encoder while the cart moves along the railway; and
   a controller configured to:
      receive the property of rotation of the rotating element from the encoder, and
      convert the property of rotation into a rotation count of the rotating element.

2. The system of claim 1, wherein the controller determines a distance traveled by the cart based on the rotation count and the calibration comprises altering a relationship between the rotation count and the distance traveled used by the controller.

3. The system of claim 2, wherein:
the means comprises:
a calibration surface positioned along the railway; and
a sensor positioned on the cart and operable to sense the calibration surface as the cart traverses the railway; and
the controller is further configured to:
sense the calibration surface using the sensor,
determine a position of the calibration surface sensed, and
direct movement of the cart at least partially based on a difference between the position of the calibration surface and the distance traveled by the cart based on the rotation count.

4. The system of claim 2, wherein movement of the cart is directed at least partially based on the distance traveled.

5. The system of claim 1, wherein the rotating element is synchronized in rotation with a drive shaft driving at least one of the wheels.

6. The system of claim 5, wherein the controller determines a distance traveled by the cart based on the rotation count, and wherein converting the rotation count into the distance traveled includes compensating for load deformation of the wheels.

7. The system of claim 1, wherein the cart comprises:
a first drive set including the motor being a first motor, at least one of the wheels being a first wheel, and the encoder being a first encoder;
a second drive set including a second motor, a second wheel, and a second encoder; and
wherein the first encoder reads a property of rotation of the rotating element, said rotating element being a first rotating element, and the second encoder reads a property of rotation of a second rotating element associated with the second wheel and the second motor.

8. The system of claim 1, further comprising:
an encoder wheel positioned to contact the railway simultaneously with the wheels driven by the motor, the encoder wheel linked to the cart by an encoder shaft; and
wherein the rotating element is the encoder shaft.

9. The system of claim 8, wherein the encoder wheel has a suspension separate from the wheels driven by the motor.

10. The system of claim 1, wherein the controller is positioned on the cart.

11. The system of claim 1, the controller further comprising a first transceiver in communication with the controller, the cart further comprising a second transceiver receiving the property of rotation from the encoder, wherein the controller receives the property of rotation of the rotating element from the encoder via a communication link between the first and second transceivers.

12. The system of claim 11, the cart further comprising a first transceiver antenna positioned at a first end of the cart and a second transceiver antenna at a second end of the cart, the first and second transceiver antennae being in communication with the second transceiver.

13. The system of claim 1, wherein the property of rotation is a positional vector.

14. A system for positioning a cart in an automated storage facility, the system comprising:
a railway having a structure facing a travel route of the railway;
a cart comprising:
a motor,
wheels positioned on the cart to engage the railway, at least one of the wheels being driven by the motor to propel the cart in the travel route,
an encoder coupled to at least one of the wheels to provide an output corresponding to a rotation of said at least one of the wheels,
a signal emitter positioned on the cart and operable to emit a signal from the cart towards the travel route of the railway, and
a signal sensor positioned on the cart and operable to sense a reflection of the signal from the structure; and
a controller configured to:
receive an output of the encoder,
direct the signal emitter to emit the signal,
receive an output of the signal sensor,
determine a distance from the cart to the structure based on the output of the signal sensor, and
calibrate the output of the encoder based on the determined distance.

15. The system of claim 14, wherein the signal is a rangefinding laser, the signal emitter is a laser emitter, and the signal sensor is a laser detector.

16. The system of claim 15, wherein the structure is a reflector facing the travel route of the railway.

17. The system of claim 16, wherein the railway includes a plurality of reflectors positioned along at least one side of the travel route of the railway, and the laser detector is configured to sense the reflection of the rangefinding laser from at least one of the plurality of reflectors.

18. The system of claim 14, wherein:
the signal emitter comprises of a plurality of signal emitters, at least one of the plurality of signal emitters operable to emit a signal in a first direction from the cart, and at least one of the plurality of signal emitters operable to emit a signal in a second direction from the cart; and
the signal sensor comprises of a plurality of signal sensors, at least one of the plurality of signal sensors operable to sense a reflection of the signal coming from the first direction, and at least one of the plurality of signal sensors operable to sense a reflection of the signal coming from the second direction.

19. The system of claim 14, wherein the railway includes a first structure at a first end and a second structure at a second end, and wherein the signal emitter is operable to selectively emit the signal toward the first structure or toward the second structure and the signal sensor is operable to sense the reflection from the first structure or from the second structure.

20. The system of claim 14, wherein the structure is positioned at an end of the travel route of the railway.

21. The system of claim 14, wherein a positional vector of the cart is at least partially controlled based on the distance determined.

22. The system of claim 14, wherein the signal is a sonic signal, the signal emitter is a sonic emitter, and the signal sensor is a sonic sensor.

23. The system of claim 14, wherein the structure is a railway surface.

24. The system of claim 14, wherein the structure is a load positioned along the railway.

25. A system for positioning a cart in an automated storage facility, the system comprising:
- a railway having a structure facing a travel route of the railway;
- a cart comprising:
  - a motor,
  - wheels positioned on the cart to engage the railway for bidirectional movement along the railway without turning,
  - an encoder coupled to at least one of the wheels to provide an output corresponding to a rotation of said at least one of the wheels, and
  - a photo sensor positioned on the cart and operable to obtain an image of the structure facing the travel route of the railway; and
- a controller configured to:
  - receive an output of the encoder,
  - obtain a first image from the photo sensor at a first time,
  - obtain a second image from the photo sensor at a second time,
  - detect a pattern at a first position in the first image,
  - detect the identical pattern at a second position in the second image,
  - determine an image distance between the first position and the second position,
  - determine a distance traveled by the cart between the first time and the second time based on the image distance and a predetermined calibration distance, and
  - calibrate the output of the encoder based on the determined distance.

26. The system of claim 25, wherein the second time occurs after the first time within a range extending between about 1 millisecond to about 100 milliseconds.

27. The system of claim 25, wherein the pattern is a shape on a surface of the structure facing the travel route of the railway.

28. The system of claim 25, wherein the predetermined calibration distance is based on a field of view (FOV) of the photo sensor.

29. The system of claim 25, wherein the structure is a side of a rail.

30. The system of claim 25, the cart further comprising a light source operable to illuminate the structure at least when the photo sensor obtains images.

31. The system of claim 25, wherein a positional vector of the cart is at least partially controlled based on the distance determined.

32. A method of controlling a cart in an automated storage facility, the storage facility having a plurality of orthogonal aisles and rows, the method comprising:
- providing a cart in a railway along one of the aisles or rows, the cart constrained to move back and forth along said one of the aisles or rows and having a position encoder;
- instructing the cart to move along the railway toward a destination position;
- determining a position of the cart at least once while the cart moves along the railway, wherein a portion of the railway is referenced to determine the position; and
- controlling movement of the cart while on the railway based on the position determined and an output of the position encoder.

33. The method of claim 32, wherein referencing the portion of the railway comprises receiving a reflection from the portion.

34. The method of claim 32, wherein referencing the portion of the railway comprises obtaining an image of the portion.

* * * * *